(12) United States Patent
Harikae et al.

(10) Patent No.: US 8,736,550 B2
(45) Date of Patent: May 27, 2014

(54) PORTABLE ELECTRONIC DEVICE, CONTROL METHOD AND PROGRAM

(75) Inventors: Masato Harikae, Yokohama (JP); Masayuki Takayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 341 days.

(21) Appl. No.: 13/014,826

(22) Filed: Jan. 27, 2011

(65) Prior Publication Data

US 2011/0181512 A1 Jul. 28, 2011

(30) Foreign Application Priority Data

Jan. 27, 2010 (JP) ................. 2010-016058
Jan. 27, 2010 (JP) ................. 2010-016061

(51) Int. Cl.
*G06F 3/038* (2013.01)

(52) U.S. Cl.
USPC .......................................... 345/157; 715/857

(58) Field of Classification Search
USPC ............... 345/156–183; 715/856–858
See application file for complete search history.

(56) References Cited

U.S. PATENT DOCUMENTS

| | | | |
|---|---|---|---|
| 7,580,731 B2 * | 8/2009 | Kim et al. ................. | 455/566 |
| 2004/0239636 A1 | 12/2004 | Takahashi | |
| 2005/0114138 A1 * | 5/2005 | Tomishige et al. ........... | 704/260 |
| 2007/0287494 A1 | 12/2007 | You et al. | |
| 2009/0002204 A1 * | 1/2009 | Mamata et al. ............... | 341/25 |
| 2009/0215500 A1 | 8/2009 | You et al. | |
| 2009/0273566 A1 * | 11/2009 | Lu et al. .................. | 345/169 |
| 2009/0284471 A1 * | 11/2009 | Longe et al. ............... | 345/168 |

FOREIGN PATENT DOCUMENTS

| | | | |
|---|---|---|---|
| JP | 02-012317 | 1/1990 | |
| JP | 04-163612 | 6/1992 | |
| JP | 0713666 | 1/1995 | |
| JP | 08241155 | 9/1996 | |
| JP | 10240416 | 9/1998 | |
| JP | 2001-274888 A | 10/2001 | |
| JP | 2004355289 | 12/2004 | |
| JP | WO/2009/025367 | * 2/2005 | .............. G06F 17/22 |
| JP | 2005284585 | 10/2005 | |
| JP | 2006005823 | 1/2006 | |
| JP | 2007267388 A | 10/2007 | |
| JP | 2008217643 | 9/2008 | |
| KR | 10-10647547 B1 | 12/2011 | |
| WO | 2009139075 A1 | 11/2009 | |

OTHER PUBLICATIONS

Notice of Reasons for Rejection issued to JP Application No. 2010-016058, mailed Aug. 6, 2013.

(Continued)

*Primary Examiner* — Abbas Abdulselam
(74) *Attorney, Agent, or Firm* — Hoffmann & Baron, LLP

(57) ABSTRACT

The present invention provides a portable electronic device which can achieve a further improvement in operability. When operations are detected by a plurality of different operation detecting units within a predetermined time interval, a controlling unit receives as input the letters assigned to each of the plurality of different operation detecting units that detect the operations, and performs predetermined processing on data related to the letters inputted. On the other hand, when operations are detected by a plurality of different operation detecting units outside a predetermined time interval, the controlling unit receives as input the letters assigned to each of the plurality of different operation detecting units that detect the operations, and does not perform predetermined processing on data related to the letters inputted.

19 Claims, 20 Drawing Sheets

(56) References Cited

OTHER PUBLICATIONS

Notice of Reasons for Rejection issued to JP Application No. 2010-016061, mailed Aug. 20, 2013.

Office Action Korean Application No. 10-2011-00074425 mailed Dec. 27, 2011.

Notice for Reasons for Rejection issued to corresponding JP Application No. 2010-016061, pp. 1-3, mailed Apr. 15, 2014.

* cited by examiner

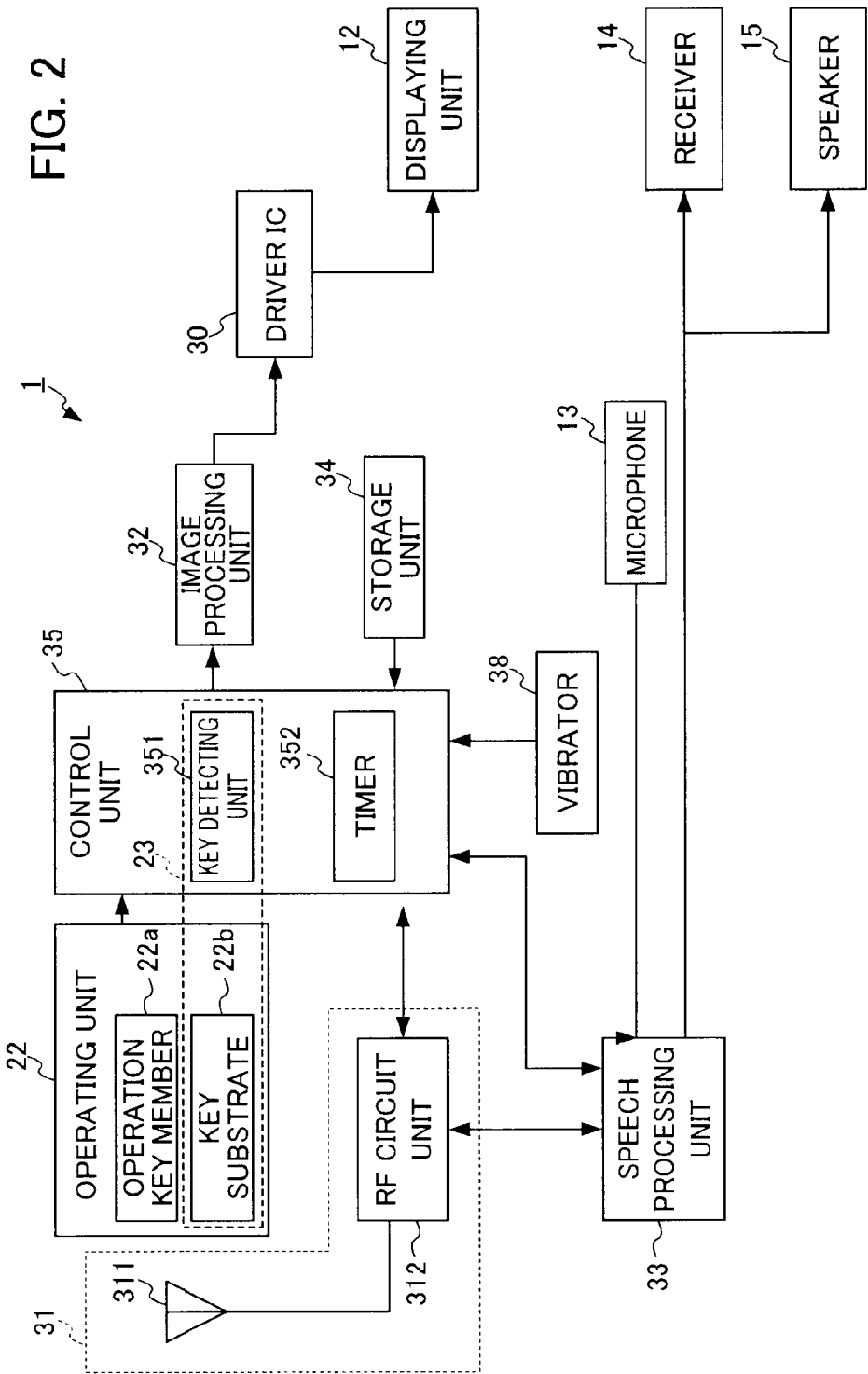

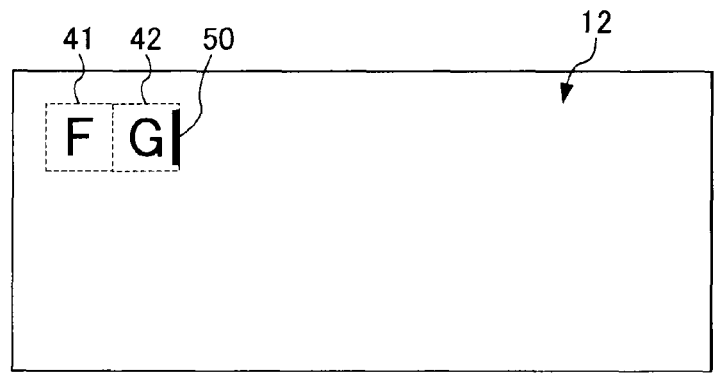
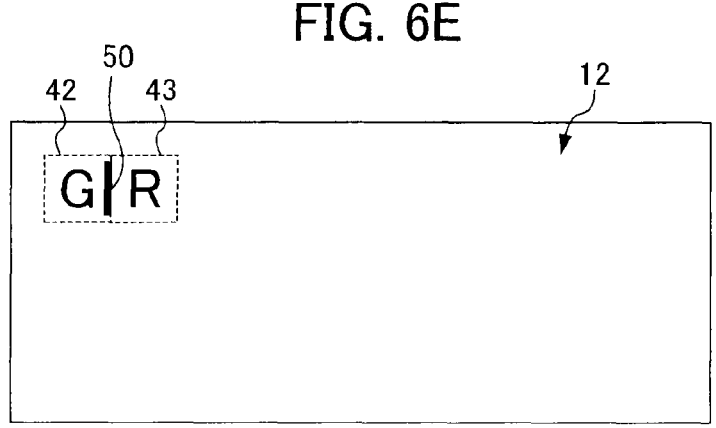
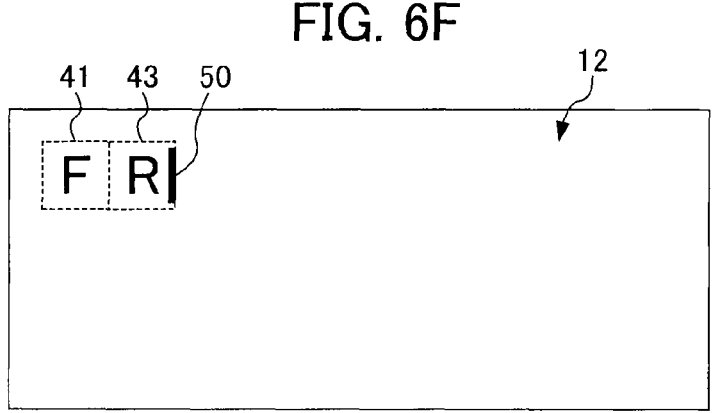

PORTABLE ELECTRONIC DEVICE, CONTROL METHOD AND PROGRAM

CROSS-REFERENCE TO RELATED APPLICATIONS

This application is based on and claims the benefit of priority from Japanese Patent Application Nos. 2010-016058 and 2010-016061, respectively filed on 27 Jan. 2010 and filed on 27 Jan. 2010, the content of which is incorporated herein by reference.

BACKGROUND OF THE INVENTION

1. Field of the Invention

The present invention relates to a portable electronic device which detects a plurality of operations.

2. Related Art

Conventionally, a portable electronic device such as an input device which has a plurality of operation detecting units has been known (for example, refer to Japanese Patent Unexamined Patent Application Publication No. 2001-274888).

SUMMARY OF THE INVENTION

However, with the above portable electronic device having a plurality of operation detecting units, the user may operate a plurality of different operation detecting units by mistake even though the user tries to operate a single operation detecting unit, and thus there is a concern over the operability of the portable electronic device being impaired. Therefore, a further improvement in operability has been demanded in the aforementioned such portable electronic device.

It is, therefore, an object of the present invention to provide a portable electronic device which achieves further improvement in the operability.

A portable electronic device according to the present invention includes: a plurality of operating units including a first operating unit and a second operating unit; a controlling unit that receives as input, when an operation to an operating unit is detected, a character assigned to the operating unit in which the operation was detected; and a time measuring unit that measures a time interval between a first operation to the first operating unit and a second operation to the second operating unit, in which the controlling unit varies processing on a plurality of characters input in response to the first operation and the second operation, between a case of the time interval between the first operation and the second operation being less than a predetermined time and a case of the time interval being at least the predetermined time.

In addition, the controlling unit may perform predetermined processing on a plurality of characters inputted in response to the first operation and the second operation in a case of the time interval being less than the predetermined time, and not perform predetermined processing on a plurality of characters inputted in response to the first operation and the second operation in a case of the time interval being at least the predetermined time.

Furthermore, the controlling unit may sequentially select one by one the plurality of characters inputted as the predetermined processing, in a case of the time interval being less than the predetermined time.

Moreover, the controlling unit may changes an order to select one by one the plurality of characters inputted, based on a predetermined rule.

The controlling unit may change a speed to select one by one the plurality of characters inputted, based on a predetermined rule Additionally, in a case of a specific operating unit among the operating units being operated when the controlling unit is performing the predetermined processing, the controlling unit may delete a character selected at a point in time when the specific operating unit is operated, or deletes a character other than a character selected among the plurality of inputted characters inputted.

Moreover, the portable electronic device may further include a notification unit, in which, in a case of the time interval being less than the predetermined time and there being a previously inputted character which had already been inputted at a point in time when the first operation is detected, the controlling unit may notify by way of the notification unit by distinguishing the plurality of characters inputted in response to the first operation and the second operation from the previously inputted character, as the predetermined processing.

In addition, the portable electronic device may further include a notification unit, in which, in a case of the time interval being less than the predetermined time and a character being additionally inputted following the operations of the operating units after the predetermined time elapses, the controlling unit may notify by way of the notification unit by distinguishing the plurality of characters inputted in response to the first operation and the second operation from the additionally inputted character, as the predetermined processing.

Furthermore, the controlling unit may vary an input rule of the plurality of characters inputted in response to the first operation and the second operation, between a case of the time interval being less than the predetermined time and a case of the time interval being at least the predetermined time Additionally, the controlling unit may receive as input the plurality of characters based on an order in which the operating units are operated in a case of the time interval being at least the predetermined time, and receive as input the plurality of characters based on arrangement positions of the operating units operates in a case of the time interval being less than the predetermined time interval.

Furthermore, the controlling unit may receive as input the plurality of characters based on an order in which the operating units are operated in a case of the time interval being at least the predetermined time, and may receive as input the plurality of characters based on a character which had already been inputted before the first operation in a case of the time interval being less than the predetermined time In addition, when a plurality of the operating units are operated in a time interval of at least the predetermined time, the controlling unit may receive as input according to a predetermined condition a character inputted in a case of a subsequent operation the same as the operations is assumed to be performed in a time interval less than the predetermined time, or when a plurality of the operating units are operated in a time interval less than the predetermined time, the controlling unit may receive as input according to a predetermined condition a character inputted in a case of a subsequent operation the same as the operations is assumed to be performed at in a time interval of at least the predetermined time.

Moreover, the controlling unit may receive as input a plurality of characters associated with the first operation and the second operation, and sequentially selects one by one the plurality of characters thus inputted, in a case of the time interval being less than the predetermined time.

Additionally, the controlling unit may change an order to select one by one the plurality of characters inputted in response to the first operation and the second operation, based on the input rule.

Furthermore, the controlling unit may change a speed to select one by one the plurality of characters inputted in response to the first operation and the second operation, based on the input rule.

In addition, when the controlling unit is selecting one by one the plurality of characters inputted in response to the first operation and the second operation, if a specific operating unit among the operating units is operated, the controlling unit may delete a character selected at a point in time when the specific operating unit is operated, or delete a character other than a character selected among the plurality of inputted characters inputted Moreover, the portable electronic device may further include a notification unit, in which, in a case of the time interval being less than the predetermined time and there being a previously inputted character which had already been inputted at a point in time when the first operation was detected, the controlling unit may notify by way of the notification unit by distinguishing the plurality of characters inputted from the previously inputted character.

Additionally, the portable electronic device may further include a display unit that displays characters and a cursor specifying a character to be a target of processing, in which the controlling unit may vary a condition related to an arrangement position of the cursor with respect to the plurality of characters inputted in response to the first operation and the second operation, between a case of the time interval being less then the predetermined time and a case of the time interval being at least the predetermined time.

Furthermore, the controlling unit may sequentially select one by one by way of the cursor the plurality of characters inputted, in a case of the time interval being less than the predetermined time.

In addition, the controlling unit may vary a condition related to the arrangement position of the cursor with respect to the plurality of characters inputted by varying an input rule of the plurality of characters inputted in response to the first operation and the second operation, between a case of the time interval being less than the predetermined time and a case of the time interval being at least the predetermined time.

A control method of a portable electronic device according to the present invention includes the step of: receiving as input, when an operation to an operating unit is detected, a character assigned to the operating unit by which the operation was detected, measuring a time interval between a first operation to a first operating unit and a second operation to a second operating unit, and varying processing on a plurality of characters inputted in response to the first operation and the second operation, between a case of the time interval between the first operation and the second operation being less than a predetermined time and a case of the time interval being at least the predetermined time.

A computer program for a portable electronic device according to the present invention includes the step of: receiving as input, when an operation to an operating unit is detected, a character assigned to the operating unit by which the operation was detected, measuring a time interval between a first operation to a first operating unit and a second operation to a second operating unit, and varying processing on a plurality of characters inputted in response to the first operation and the second operation, between a case of the time interval between the first operation and the second operation being less than a predetermined time and a case of the time interval being at least the predetermined time.

The present invention can provide a portable electronic device which can achieve a further improvement in operability.

BRIEF DESCRIPTION OF THE DRAWINGS

FIG. 2 is a block diagram illustrating a functional configuration of the cellular telephone 1 according to the present embodiment;

FIG. 6D is a view illustrating processing when operations are detected by three operation detecting units 23;

FIG. 6E is a view illustrating processing when operations are detected by three operation detecting units 23;

FIG. 6F is a view illustrating processing when operations are detected by three operation detecting units 23;

DETAILED DESCRIPTION OF THE INVENTION

First Embodiment

Preferred embodiments for carrying out the present invention will be described below with reference to the drawings. First, the basic structure of a cellular telephone 1 according to one embodiment of a portable electronic device of the present invention will be described with reference to FIG. 1.

Figure 1A:
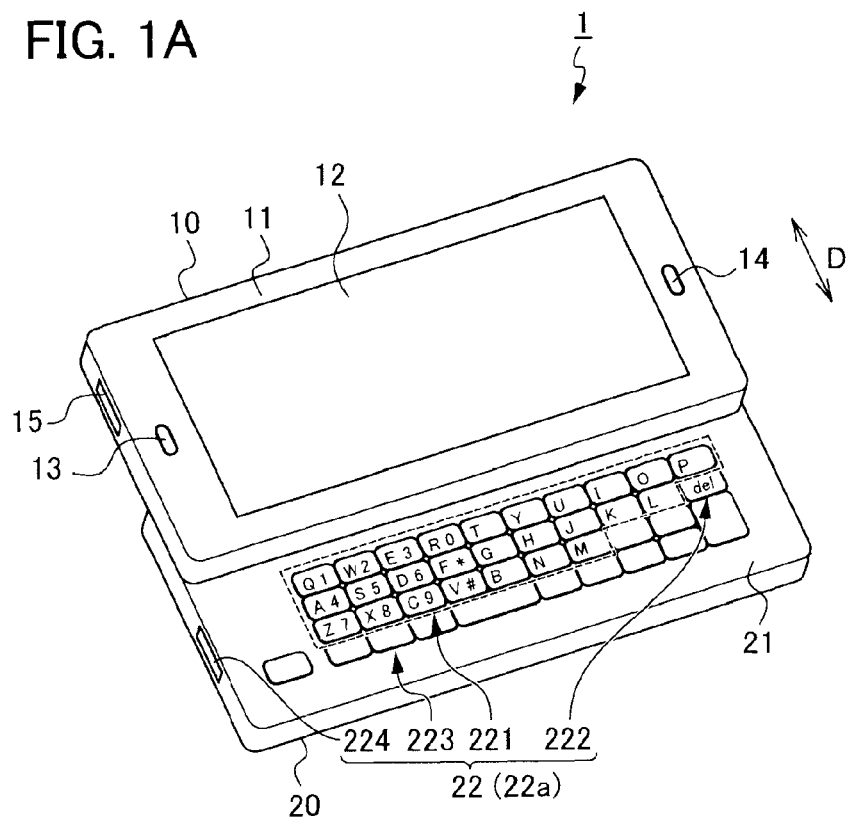
FIG. 1A is a perspective view of an appearance of a cellular telephone 1 according to the present embodiment.
Figure 1B:
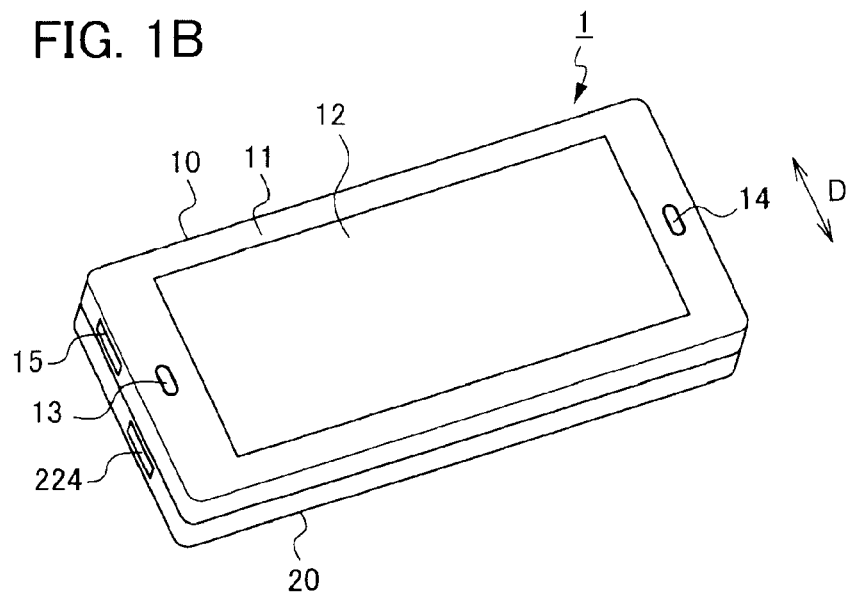
FIG. 1B is a perspective view of an appearance of a cellular telephone 1 according to the present embodiment.

FIG. 1 is a perspective view of an appearance of the cellular telephone 1 according to the first embodiment. More specifically, FIG. 1A is a view illustrating an opened state of the cellular telephone 1, and FIG. 1B is a view illustrating a closed state of the cellular telephone 1.

The cellular telephone 1 has a first body 10 and a second body 20. With the first body 10, a display unit 12 is arranged on a front surface 11 of the first body 10. When predetermined internal processing is executed, the display unit 12 at least displays letters or numbers according to the operation of the operating unit 22 described later. Furthermore, the display unit 12 executes predetermined interval processing, and displays various information (text information or image information) of a telephone number or an electronic mail address of the communicating party and contents of an electronic mail.

In addition, a microphone 13 and a receiver 14 are arranged in the first body 10 on the front surface 11 thereof. The microphone 13 is used to input speech uttered by the user of the cellular telephone 1 upon communication. The receiver 14 outputs the speech of the communicating party. Furthermore, a speaker 15 is arranged in the first body 10 on the lateral surface thereof. The speaker 15 outputs, for example, speech for notifying of an incoming call to the cellular telephone 1.

The operating unit 22 is arranged in the second body 20 on a front surface 21 thereof. The front surface 21 refers to a surface facing the back surface of the first body 10 (the surface on the opposite side of the front surface 11 of the first body 10).

The first body 10 and second body 20 are connected by means of a connecting member (not illustrated). Then, the first body 10 and second body 20 are configured to be movable along the opening/closing direction D by means of the connecting member.

The second body 20 is placed in an opened state by being relatively moved with respect to the first body 10 (see FIG. 1A), or is placed in a closed state by being arranged to superimpose the first body 10 (see FIG. 1B). That is, the cellular telephone 1 is placed in a closed state by arranging the first body 10 and second body 20 to superimpose each other from a plan view, and is placed in an opened state by pulling the second body 20 sideways with respect to the first body 10 (by pushing the first body 10 sideways with respect to the second body 20).

The operating unit 22 can be operated when the first body 10 and second body 20 are relatively moved and placed in an opened state. The operating unit 22 is configured with a key arrangement of so-called QWERTY arrangement. The operating unit 22 employs a configuration including an operation key member 22a and a key switch 22b. The operation key member 22a includes: first keys 221 (keys enclosed by a broken line part in FIG. 1A) each assigned a character (e.g., letter, symbol or number); a delete key ("del" key in FIG. 1A) 222 for deleting an inputted character; second keys 223 assigned no text, symbol or number such as a Ctrl key or Shift key; and a side key 224.

The side key 224 is arranged in the left side surface of the second body 20 when the operating unit 23 is seen from a plan view, and is externally exposed both in the opened state and closed state.

Next, the functional configuration of the cellular telephone 1 will be described while referring to FIG. 2. FIG. 2 is a block diagram illustrating the functional configuration of the cellular telephone 1 according to the present embodiment. The cellular telephone 1 has the operating unit 22, the microphone 13, the display unit 12, the receiver 14, the speaker 15, a driver IC 30, a communicating unit 31, an image processing unit 32, a speech processing unit 33, a storage unit 34, a controlling unit 35 and a vibrator 38.

The operation key member 22a is formed with a plurality of operation key members. The key substrate 22b has a plurality of key switches (not illustrated). Each of the plurality of key switches is arranged in a position associated with each operation key member 22a. Each of the plurality of key switches arranged on the key substrate 22b adopts, for example, a structure which has a metal dome of a metal plate three-dimensionally formed by bending into a bowl shape. When the apex of the bowl shape of the metal dome is pressed, the metal dome is configured to contact and electrically conduct with a switch terminal formed in an electrical circuit (not illustrated) printed on the surface of the key substrate 22b.

The communicating unit 31 has a main antenna 311 and an RF circuit unit 312, and communicates with predetermined communication destinations. The communication destinations with which the communicating unit 31 communicates include an external terminal device which makes calls to and transmits and receives electronic mails to and from the cellular telephone 1, and an external device such as an external web server through which the cellular telephone 1 connects with the Internet.

The main antenna 311 communicates with an external device in a predetermined usable frequency band. The RF circuit unit 312 demodulates a signal received at the main antenna 311, and supplies the demodulated signal to the controlling unit 35. Furthermore, the RF circuit unit 312 modulates the signal supplied from the controlling unit 35, and transmits the signal to an external device (base station) through the main antenna 311.

The image processing unit 32 performs predetermined image processing according to the control by the controlling unit 35, and outputs the processed image data to the driver IC 30. The driver IC 30 stores image data supplied from the image processing unit 32, in frame memory (not illustrated), and outputs the image data to the display unit 12 at a predetermined timing.

The speech processing unit 33 performs predetermined speech processing on the signal supplied from the RF circuit unit 312 according to control by the controlling unit 35, and outputs the processed signal to the receiver 14 and speaker 15. The receiver 14 and speaker 15 output the signal supplied from the speech processing unit 33 to the outside.

Furthermore, the speech processing unit 33 processes the signal inputted from the microphone 13 according to the control by the controlling unit 35, and outputs the processed signal to the RF circuit unit 312. The RF circuit unit 312 performs predetermined processing of the signal supplied from the speech processing unit 33, supplies the processed signal to the main antenna 311 and outputs the signal to the outside as a radio wave from the main antenna 311.

The storage unit 34 includes, for example, working memory, and is utilized for arithmetic operations in the controlling unit 35. In addition, the storage unit 34 stores, for example, data and tables utilized by various applications which operate in the cellular telephone 1. For example, the storage unit 34 stores an address book, an electronic mail DB which stores electronic mails, various dictionaries, etc. In addition, the storage unit 34 may be a detachable external memory.

The controlling unit 35 controls the entirety of the cellular telephone 1, and performs predetermined control of the display unit 12, communicating unit 31, image processing unit 32, speech processing unit 33 and vibrator 38. Furthermore, the controlling unit 35 has a key detecting unit 351 which detects that a key switch 22b-1 is pressed when the key switch 22b-1 is pressed and the pressed key switch 22b-1 contacts and electrically conducts with a switch terminal. Then, the key switch 22b-1 and key detecting unit 351 configure the operation detecting unit 23. The vibrator 38 causes vibration by being driven by the controlling unit 35. The vibrator 38 causes vibration to perform notification to the user.

Figure 3:
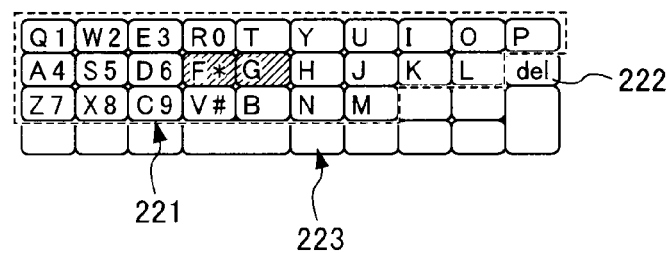
FIG. 3 is a schematic view illustrating a state in which operations are detected by two operation detecting units 23.

Next, characteristic operations (processing) of the cellular telephone 1 according to first embodiment will be described. FIG. 3 is a schematic view illustrating a state (shaded part in FIG. 3) in which operations are detected by two operation detecting units 23 associated with the letter "F" and letter "G" of the first keys 221. FIG. 4A to FIG. 4D are views illustrating processing when the operations are detected by two operation detecting units 23.

The cellular telephone 1 according to the first embodiment has a function of improving the operability when the operation detecting units 23 are pushed at the same time. The operations (processing) causing functions to be exhibited by the cellular telephone 1 according to the first embodiment will be described.

It should be noted that, in the first embodiment, "operation detecting units 23 are pushed at the same time" indicates that operations are detected by a plurality of operation detecting units 23 within a predetermined time interval T. Furthermore, "operation detecting units 23 are not pushed at the same time" indicates that operations are detected by a plurality of operation detecting units 23 outside the predetermined time interval T. In addition, the predetermined time interval T is counted from the time when an operation is detected first by one operation detecting unit 23 and is measured by a timer 352. However, when operations of a plurality of operation detecting units 23 are not detected within the predetermined time interval T, the controlling unit 35 resets the count of the predetermined time interval T after the predetermined time interval T elapses.

That is, "operation detecting units 23 pushed at the same time" includes the one operation detecting unit 23 which detects the operation first, and includes a plurality of operation detecting units 23 which detects an operation from when the operation is detected by the one operation detecting unit 23 until the predetermined time interval T elapses. It should be noted that the predetermined time interval T is, for example, about 0.1 seconds.

When operations are detected by a plurality of operation detecting units 23, the controlling unit 35 receives as input the letters assigned to the operation detecting units 23 which detect the operations. In addition, the controlling unit 35 makes various settings related to inputted letters such as the color, size, the type of font, and background color of inputted letters, and inputs (displays) the letters to the display unit 12. Then, when operations are detected by a plurality of different operation detecting units 23 within the predetermined time interval T, the controlling unit 35 receives as input the letters assigned to each of the plurality of different operation detecting units 23 which detect the operations, and performs predetermined processing on data related to the inputted letters.

On the other hand, when operations are detected by a plurality of different operation detecting units 23 outside the predetermined time interval T, the controlling unit 35 receives as input the letters assigned to each of the plurality of different operation detecting units 23 which detect the operations, and does not perform predetermined processing on the data related to the inputted letters.

More specifically, when pushing of the adjacent letter "F" key and letter "G" key of the first keys 221 is detected by the operation detecting units 23 associated with the respective keys within the predetermined time interval T (see FIG. 3), the controlling unit 35 receives as input the letter "F" and the letter "G" assigned to each of the operation detecting units 23 that detect the operations (see FIG. 4A), and performs predetermined processing on an area 41 and area 42 associated with the inputted letter "F" and letter "G".

Figure 4A:
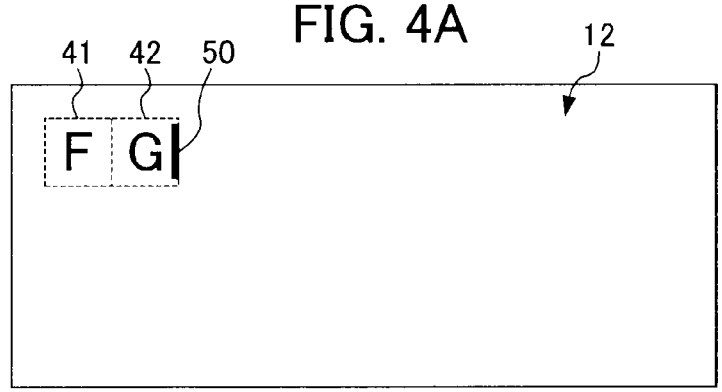
FIG. 4A is a view illustrating processing when operations are detected by two operation detecting units 23.
Figure 4B:
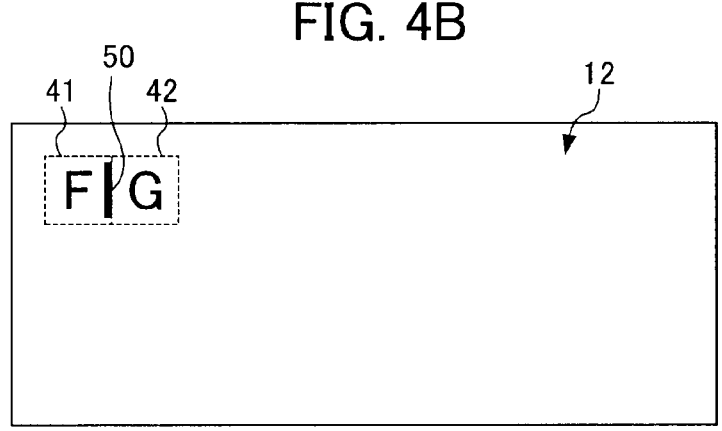
FIG. 4B is a view illustrating processing when operations are detected by two operation detecting units 23.

Here, the controlling unit 35 performs processing of sequentially selecting one of a plurality of the inputted letter "F" and letter "G" using a cursor 50, as predetermined processing (see FIG. 4A and FIG. 4B). It should be noted that, in the first embodiment, "selecting a letter" includes not only a case in which a letter and an area associated with this letter are selected and placed in an active state, but also a case in which the cursor 50 is displayed in the area associated with this letter.

On the other hand, when pushing of the adjacent letter "F" key and letter "G" key of the first keys 221 is detected by the operation detecting units 23 associated with the respective keys outside the predetermined time interval T (see FIG. 3), the controlling unit 35 receives as input the letter "F" and the letter "G" assigned to each of the operation detecting units 23 which detect the operations (see FIG. 4A), and does not perform predetermined processing on the area 41 and area 42 associated with the inputted letter "F" and the letter "G".

Furthermore, the controlling unit 35 may change the order to select one of a plurality of the inputted letter "F" and letter "G" based on a predetermined rule. For example, "the letter inputted first is selected first" may be used as the predetermined rule. Usually, the controlling unit 35 selects the area 42 associated with the subsequently inputted letter "G" using the cursor 50. However, in this case, the controlling unit 35 selects the area 41 associated with the previously inputted letter "F" using the cursor 50. Next, the controlling unit 35 selects the area 42 associated with the subsequently inputted letter "G" using the cursor 50.

Furthermore, the controlling unit 35 may change the speed to select one of the plurality of inputted letter "F" and letter "G" based on a predetermined rule. For example, "the speed to select the letter inputted first is slower than the speed to select the subsequently inputted letter" may be used as the predetermined rule. In this case, the controlling unit 35 selects the area 41 associated with the letter "F" inputted first, during the time interval T1 using the cursor 50. Next, the controlling unit 35 selects the area 42 associated with the subsequently inputted letter "G", during a time interval T2 (T1>T2), which is shorter than the time interval T1, using the cursor 50.

The controlling unit 35 notifies by way of the display unit 12 serving as the notification unit by distinguishing the letter "F" or the letter "G" selected as a result of predetermined processing, from the other letter "F" or letter "G" not selected as a result of predetermined processing.

That is, the controlling unit 35 makes the display unit 12 perform notification by displaying the cursor 50 in the area 41 associated with the letter "F" or the area 42 associated with the letter "G" and distinguishing the selected letter "F" or letter "G" from the other letter "F" or letter "G" that is not selected. It should be noted that the notification unit is by no means limited to the display unit 12, and, for example, the controlling unit 35 may perform notification by varying the tone of the sound outputted from the speaker 15 to distinguish the selected letter "F" or letter "G" from the other letter "F" or letter "G" that is not selected.

Furthermore, when an operation is detected by a specific operation detecting unit (for example, the first keys 221 each assigned letters, symbols or numbers) of a plurality of different operation detecting units 23 within the predetermined time interval T, the controlling unit 35 performs predetermined processing.

Then, when the controlling unit 35 performs processing of sequentially selecting one of a plurality of the inputted letter "F" and letter "G" using the cursor 50 as predetermined processing, if an operation is detected by the operation detecting unit 23 (specific operation detecting unit) of the operation detecting units 23 associated with the delete key 222, the controlling unit 35 deletes the letter in an area selected by the cursor 50 as a result of predetermined processing at the point in time when the operation is detected by the operation detecting unit 23 associated with the delete key 222. It should be noted that the present invention is not limited to deleting a letter in an area selected by the cursor 50, and may be configured to leave the letter in the selected area and delete the other letters pushed at the same time.

Figure 4C:
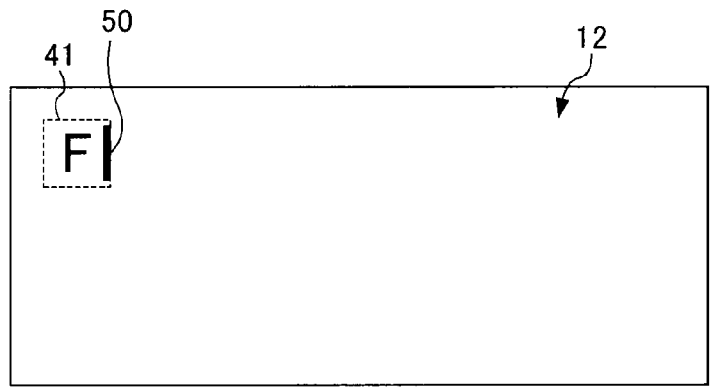
FIG. 4C is a view illustrating processing when operations are detected by two operation detecting units 23.
Figure 4D:
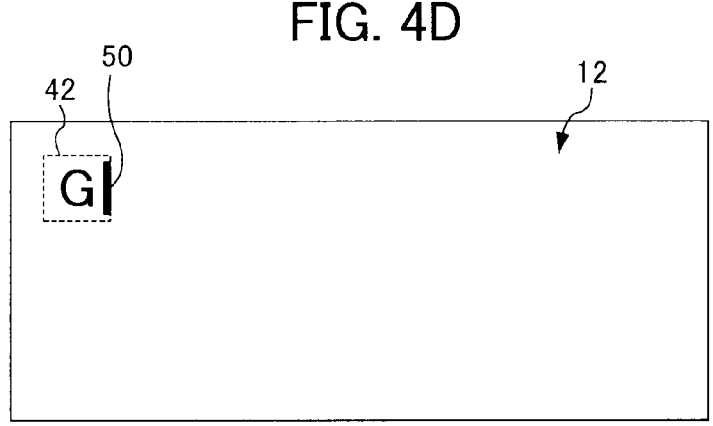
FIG. 4D is a view illustrating processing when operations are detected by two operation detecting units 23.

More specifically, when the inputted letter "G" is selected by the cursor 50 (see FIG. 4A), if the operation is detected by the operation detecting unit 23 associated with the delete key 222, the controlling unit 35 deletes the letter "G" in the area 42 selected at this point in time (see FIG. 4C). On the other hand, when the inputted letter "F" is selected by the cursor 50, if the operation is detected by the operation detecting unit 23 associated with the delete key 222, the controlling unit 35 deletes the letter "F" in the area 41 selected at this point in time (see FIG. 4D).

Although a case has been described with the examples illustrated in above FIG. 3 and FIG. 4A to FIG. 4D in which operations are detected by the two operation detecting units 23 associated with the letter "F" and letter "G" within the predetermined time interval T, the present invention is by no means limited to this. The cellular telephone 1 according to the present invention is applicable even in a case in which operations are detected by three or more operation detecting units 23 within the predetermined time interval T.

Figure 5:
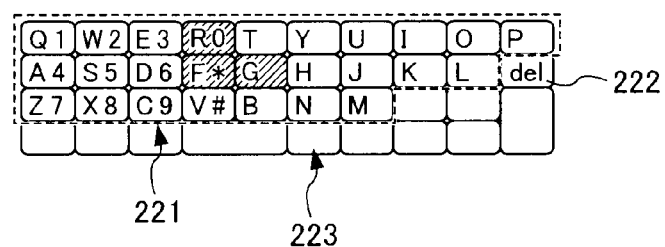
FIG. 5 is a schematic view illustrating a state in which operations are detected by three operation detecting units 23.

FIG. 5 is a schematic view illustrating a state in which operations are detected by the three operation detecting units 23 associated with the letter "R", the letter "F" and the letter "G" of the first keys 221 (shaded part in FIG. 5). FIG. 6A to FIG. 6F are views illustrating processing when operations are detected by the three operation detecting units 23.

When the pushing of the adjacent letter "R" key, letter "F" key and letter "G" key of the first keys 221 is detected by the operation detecting units 23 associated with the respective keys (see FIG. 5) within the predetermined time interval T, the controlling unit 35 receives as input the letter "R", the "letter "F" and the letter "G" assigned to each of the operation detecting units 23 which detect the operations (see FIG. 6A), and performs predetermined processing on the area 41, the area 42 and the area 43 associated with the inputted letter "R", the letter "F" and the letter "G".

Figure 6A:
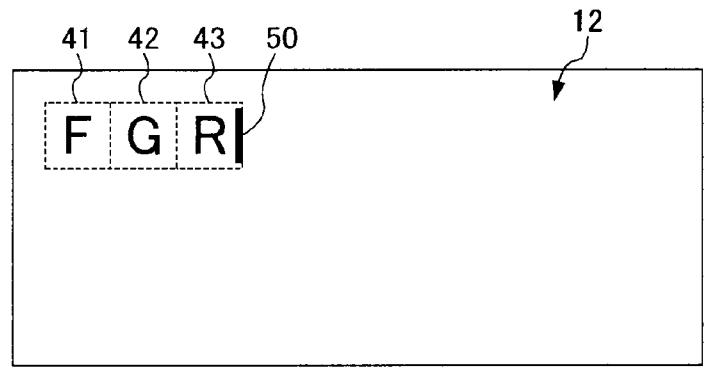
FIG. 6A is a view illustrating processing when operations are detected by three operation detecting units 23.
Figure 6B:
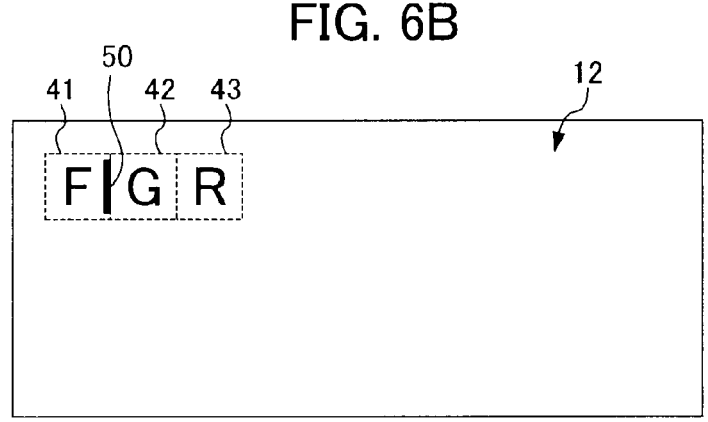
FIG. 6B is a view illustrating processing when operations are detected by the three operation detecting units 23.
Figure 6C:
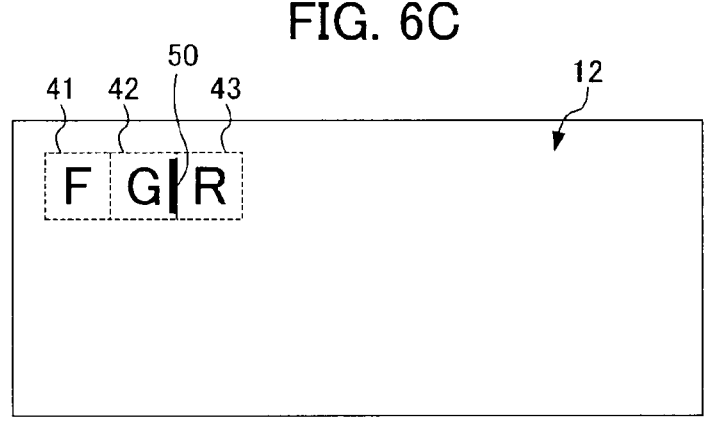
FIG. 6C is a view illustrating processing when operations are detected by three operation detecting units 23.

Here, similar to the above FIG. 3, FIG. 4A and FIG. 4B, as predetermined processing, the controlling unit 35 performs processing of sequentially selecting one of the inputted letter "R", letter "F" and letter "G" using the cursor 50 (see FIG. 6A, FIG. 6B and FIG. 6C).

Then, when the inputted letter "R" is selected by the cursor 50 (see FIG. 6A), if an operation is detected by the operation detecting unit 23 associated with the delete key 222, the controlling unit 35 deletes the letter "R" in the area 43 selected at this point of time (see FIG. 6D). In addition, when the inputted letter "F" is selected by the cursor 50, if an operation is detected by the operation detecting unit 23 associated with the delete key 222, the controlling unit 35 deletes the letter "F" in the area 41 selected at this point in time (see FIG. 6E). Moreover, when the inputted letter "G" is selected by the cursor 50, if an operation is detected by the operation detecting unit 23 associated with the delete key 222, the controlling unit 35 deletes the letter "G" in the area 42 selected at this point in time (see FIG. 6F).

Furthermore, the controlling unit 35 may perform notification corresponding to the predetermined processing using the speaker 15 or vibrator 38 of the notification unit. More specifically, the controlling unit 35 performs notification corresponding to the predetermined processing by outputting a sound from the speaker 15 or causing the vibrator 38 to vibrate.

FIG. 7A to FIG. 7F are views illustrating a different mode of predetermined processing by the controlling unit 35. When operations are detected by a plurality of different operation detecting units 23 associated with the letter "F" and letter "G" of the first keys 221 within the predetermined time interval T, the controlling unit 35 receives as input the letter "F" and the letter "G" assigned to each of a plurality of different operation detecting units 23 that detect the operations. Furthermore, in a case of there existing a previously inputted letter "A" which has already been inputted at the point in time when the operations are detected, the controlling unit 35 may perform predetermined processing by distinguishing the inputted letters from the previously inputted letter to notify (display) by means of the display unit 12 serving as the notification unit (see FIG. 7A to FIG. 7F).

Figure 7A:
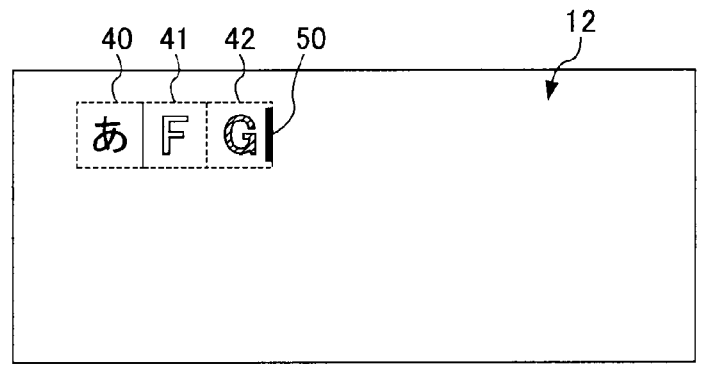
FIG. 7A is a view illustrating a different mode of predetermined processing by a controlling unit 35.
Figure 7B:
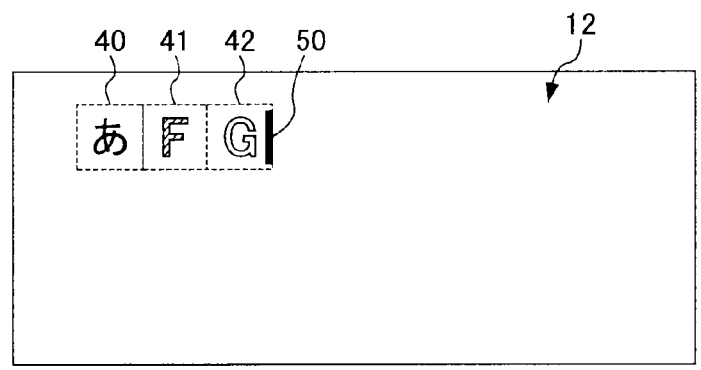
FIG. 7B is a view illustrating a different mode of predetermined processing by the controlling unit 35.
Figure 7C:
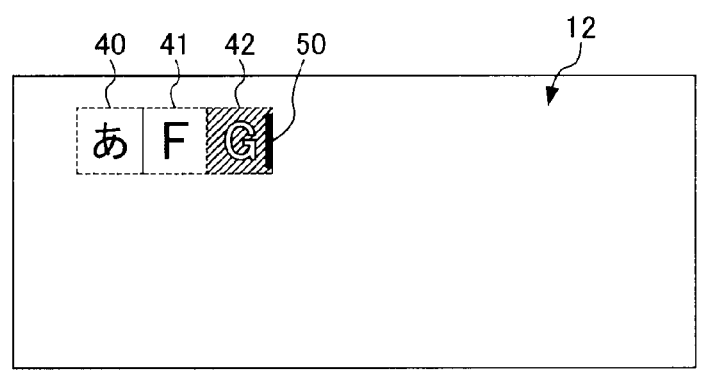
FIG. 7C is a view illustrating a different mode of predetermined processing of the controlling unit 35.
Figure 7D:
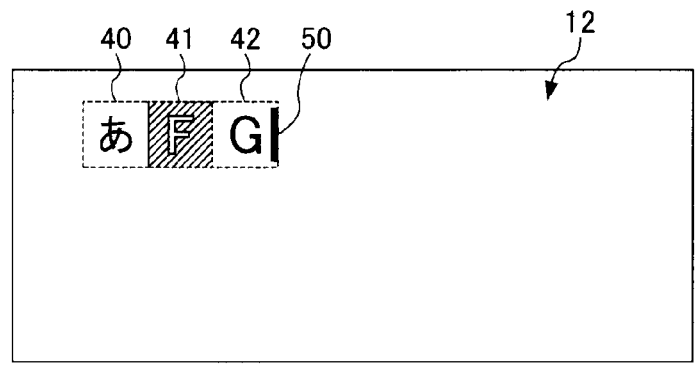
FIG. 7D is a view illustrating a different mode of predetermined processing by the controlling unit 35.
Figure 7E:
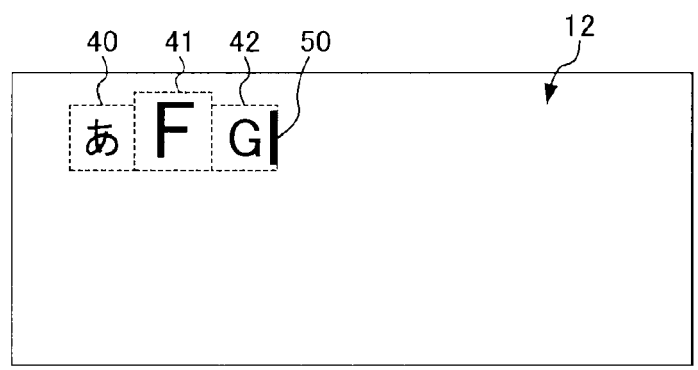
FIG. 7E is a view illustrating a different mode of predetermined processing by the controlling unit 35.
Figure 7F:
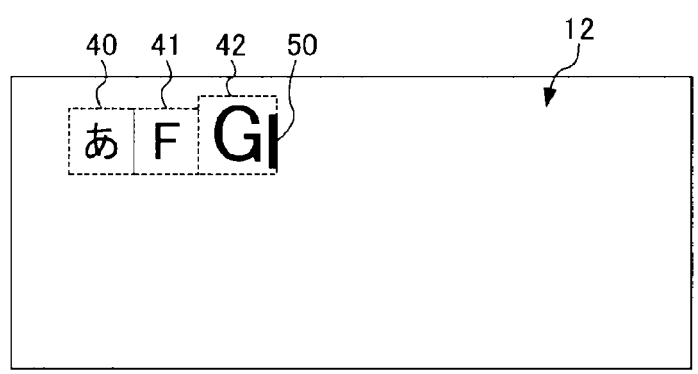
FIG. 7F is a view illustrating a different mode of predetermined processing by the controlling unit 35.
Figure 7G:
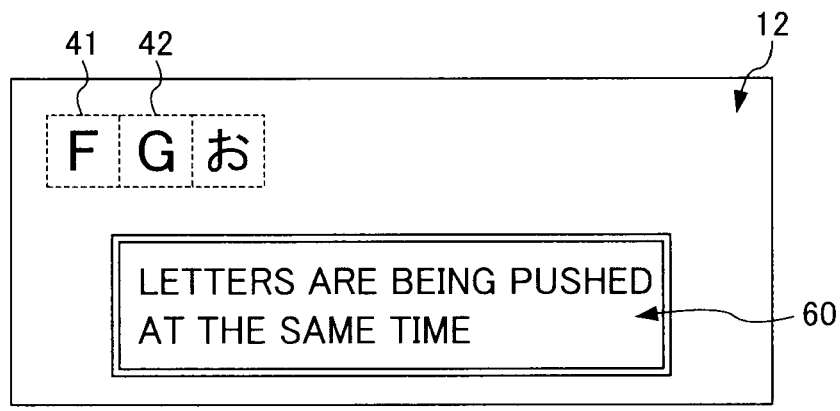
FIG. 7G is a view illustrating a different mode of predetermined processing by the controlling unit 35.

Here, the display unit 12 performs notification (displaying) by, for example, sequentially changing the color of one among the letter "F" and letter "G" (see FIG. 7A and FIG. 7B), sequentially inverting and displaying one among the area 41 and area 42 associated with the letter "F" and "letter G" (see FIG. 7C and FIG. 7D), sequentially enlarging and displaying one among the letter "F" and letter "G" (see FIG. 7E and FIG. 7F) or displaying a message showing that the keys are pushed at the same time (see the message 60 of FIG. 7G).

In addition, when operations are detected by the plurality of different operation detecting units 23 associated with the letter "F" and letter "G" of the first keys 221 within the predetermined time interval T, the controlling unit 35 receives as input the letter "F" and letter "G" assigned to each of the plurality of different operation detecting units 23 which detect the operations. Furthermore, when the operation is detected by the operation detecting unit 23 associated with the letter "A" of the first keys 221 after the predetermined time interval T is measured, and the letter "A" assigned to the operation detecting unit 23 which detects the operation is additionally inputted, the controlling unit 35 may notify by way of the display unit 12 serving as the notification unit by distinguishing the letter "F" and letter "G" assigned to each of a plurality of different operation detecting units 23, from the newly inputted letter "A".

Here, the display unit 12 performs notification (displaying) by, for example, sequentially changing the color of one among the letter "F" and letter "G", sequentially inverting and displaying one among the area 41 and area 42 associated with the letter "F" and letter "G", sequentially enlarging and displaying one among the letter "F" and letter "G" or displaying a message showing that the keys are pushed at the same time.

Figure 8:
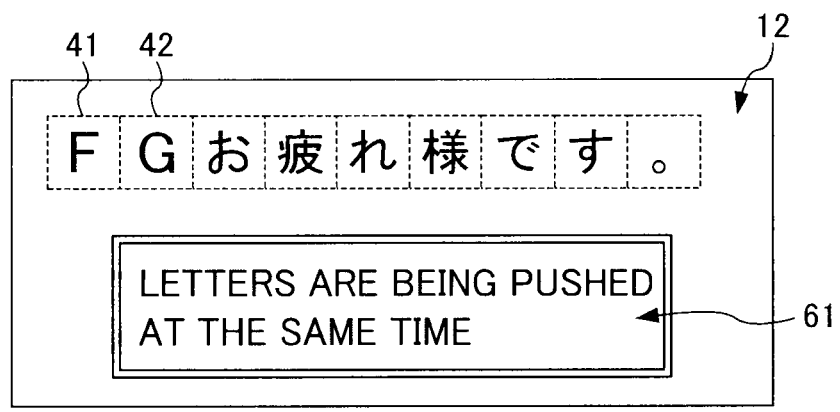
FIG. 8 is a view illustrating a message displayed on a display unit 12 by a notification unit.

FIG. 8 is a view illustrating the message displayed on the display unit 12 serving as the notification unit. When operations are detected by the plurality of different operation detecting units 23 associated with the letter "F" and letter "G" of the first keys 221 within the predetermined time interval T, the controlling unit 35 receives as input the letter "F" and the letter "G" assigned to each of the plurality of different operation detecting units 23 that detect the operations. Furthermore, when the operation of ending a function associated with the inputted letter (for example, the function of inputting an electronic mail text of an electronic mail application) after the predetermined time interval T has elapsed, the controlling unit 35 may display the message 61 notifying of the operation on the display unit 12 (see FIG. 8).

In addition, when operations are detected by the plurality of different operation detecting units 23 associated with the letter "F" and letter "G" of the first keys 221 within the predetermined time interval T, the controlling unit 35 may receive as input the letter "F" and the letter "G" assigned to each of a plurality of different operation detecting units 23 that detect the operations, and, as predetermined processing, perform selection of the inputted letters according to a predetermined condition such as pushing of the side key 224.

That is, when operations are detected by the plurality of different operation detecting units 23 associated with the letter "F" and the letter "G" of the first keys 221, the controlling unit 35 receives as input the letter "F" and the letter "G" assigned to each of the plurality of different operation detecting units 23 that detect the operations (see FIG. 4A). Then, the controlling unit 35 sequentially selects one or both of the inputted letter "F" and letter "G" in response to detection of the operation by the operation detecting unit 23 associated with the side key 224 using the cursor 50.

Figure 9:
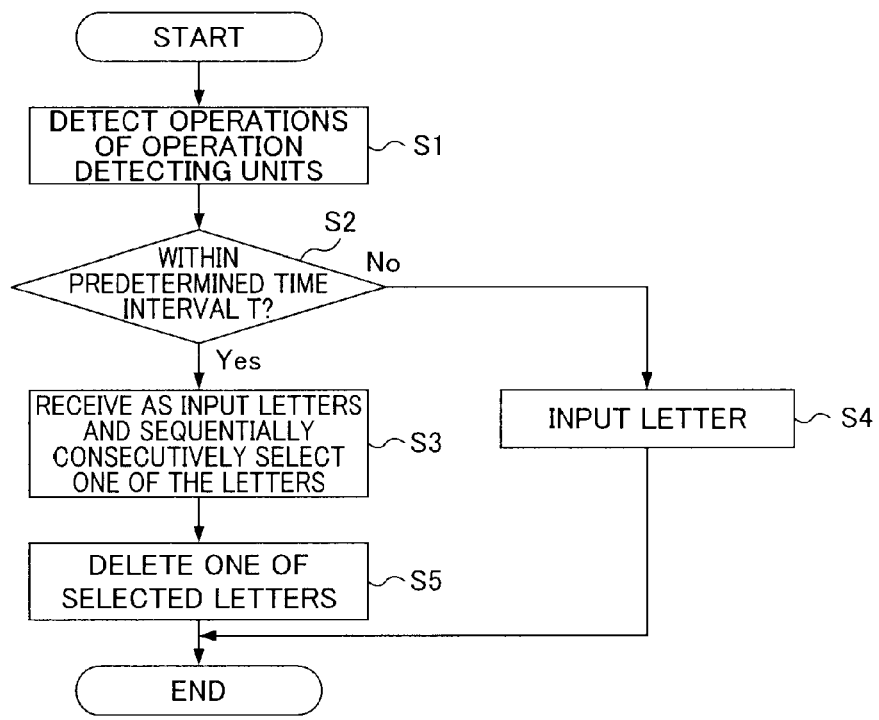
FIG. 9 is a flowchart illustrating an example of processing by the controlling unit 35.

FIG. 9 is a flowchart illustrating one example of the above processing of the controlling unit 35. It should be noted that, in the processing illustrated in FIG. 9, a case is described in which the operation detecting units 23 associated with the letter "F" and the letter "G" of the first keys 221 are operated.

In Step S1, the operation detecting units 23 detect the operations of the first keys 221 associated with the letter "F" and the letter "G" (see FIG. 3).

In Step S2, the controlling unit 35 determines whether or not the detected operation is within the predetermined time interval T. In a case of the operation being detected within the predetermined time interval T, the processing advances to Step S3. On the other hand, in a case of the operation being detected outside the predetermined time interval T, the processing advances to Step S4.

In Step S3, the controlling unit 35 receives as input the letter "F" and letter "G" assigned to each of the operation detecting units 23 that detect the operations (see FIG. 4A), and, as predetermined processing, performs processing of sequentially selecting one among the inputted letter "F" and letter "G" using the cursor 50 (see FIG. 4A and FIG. 4B).

In Step S4, the controlling unit 35 receives as input the letter "F" and the letter G" assigned to each of the operation detecting units 23 that detect the operations.

In Step S5, when the inputted letter "G" is selected by the cursor 50 (see FIG. 4A), if an operation is detected by the operation detecting unit 23 associated with the delete key 222, the controlling unit 35 deletes the letter "G" in the area 42 selected at this point in time (see FIG. 4C). On the other hand, when the inputted letter "F" is selected by the cursor 50, if an operation is detected by the operation detecting unit 23 associated with the delete key 222, the controlling unit 35 deletes the letter "F" in the area 41 selected at this point in time (see FIG. 4D).

The cellular telephone 1 of first embodiment can provide the following effects. When operations are detected by a plurality of different operation detecting units 23 within the predetermined time interval T, the controlling unit 35 receives as input the letters assigned to each of the plurality of different operation detecting units 23 that detect the operations, and performs predetermined processing on data related to the inputted letters. On the other hand, when operations are detected by a plurality of different operation detecting units 23 outside the predetermined time interval T, the controlling unit 35 receives as input the letters assigned to each of the plurality of different operation detecting units 23 that detect the operations, and performs predetermined processing on data related to the inputted letters.

The cellular telephone 1 thereby varies the processing on predetermined areas associated with inputted letters, between a case of operations being detected by a plurality of different operation detecting units 23 within the predetermined time interval T and a case of operations being detected by a plurality of different operation detecting units 23 outside the predetermined time interval T. In other words, the cellular telephone 1 varies the processing on predetermined areas associated with the letters inputted in response to an input of letters, between a case of a plurality of operation detecting units 23 being pushed at the same time and a case of a plurality of operation detecting units 23 not being pushed at the same time. Therefore, the cellular telephone 1 can achieve a further improvement in operability.

In addition, the controlling unit 35 may perform processing of sequentially selecting one among a plurality of inputted letter "F" and letter "G" using the cursor 50, as predetermined processing. In other words, the cellular telephone 1 sequentially selects one among the letter "F" and the letter "G" pushed at the same time using the cursor 50. Letters simultaneously pushed are thereby sequentially selected in a case of the user of the cellular telephone 1 mistakenly operating a plurality of operation detecting units 23 despite trying to operate a single operation detecting unit 23. As a result, the user of the cellular telephone 1 can easily delete a letter originally inputted unintentionally. Consequently, the cellular telephone 1 can achieve a further improvement in operability.

In addition, the controlling unit 35 changes the order to select one among the plurality of the inputted letter "F" and letter "G" based on a predetermined input rule. The user of the cellular telephone 1 can thereby quickly delete the letter mistakenly inputted by an operation mistake, in a case of keys being mistakenly pushed at the same time, by performing an operation taking into account a predetermined rule.

In addition, the controlling unit 35 changes the speed to select one of the plurality of the inputted letter "F" and letter "G" based on a predetermined rule. The user of the cellular telephone 1 can thereby more reliably select one of the letters pushed at the same time and, consequently, more quickly delete the letter inputted by an operation mistake.

Moreover, when the controlling unit 35 performs processing of sequentially selecting one of the inputted letter "F" and letter "G" using the cursor 50, as predetermined processing, if an operation is detected by the operation detecting unit 23 associated with the delete key 222 among the operation detecting units 23, the controlling unit 35 deletes the letter in the area selected by the cursor 50 as a result of predetermined processing at the point in time when the operation is detected by the operation detecting unit 23 associated with the delete key 222. The user of the cellular telephone 1 can thereby more reliably delete one of letters pushed at the same time. Consequently, the cellular telephone 1 can achieve a further improvement in operability.

In addition, the controlling unit 35 distinguishes the letter "F" or the letter "G" selected as a result of predetermined processing, from the other among the letter "F" or the letter "G" that is not selected as a result of the predetermined processing to notify by way of the display unit 12. The user of the cellular telephone 1 can thereby clearly recognize letters pushed at the same time.

Furthermore, in a case of an operation being detected by a specific operation detecting unit 23 (for example, the first keys 221) among the plurality of the operation detecting units 23 within the predetermined time interval T, the controlling unit 35 performs predetermined processing. By this means, in a case of a second key 223 such as the Shift key or Ctrl key that is frequently pushed at the same time being operated, predetermined processing is not performed, and in a case of the first key 221 being operated, predetermined processing is performed. Consequently, the cellular telephone 1 can achieve an improvement in operability according to the operation of the operation detecting units 23.

In addition, the controlling unit 35 performs notification corresponding to the predetermined processing by way of the speaker 15 or the vibrator 38 serving as the notification unit. It is thereby possible to notify the user that keys are pushed at the same time even when, for example, the user of the cellular telephone 1 does not visually checking the display unit 12.

When operations are detected by the plurality of different operation detecting units 23 associated with the letter "F" and letter "G" of the first keys 221 within the predetermined time interval T, the controlling unit 35 receives as input the letter "F" and the letter "G" assigned to each of the plurality of different operation detecting units 23 that detect the operations. Furthermore, in a case of there being a previously inputted letter "A" that has already been inputted at the point in time when the operations are detected, the controlling unit 35 performs predetermined processing by distinguishing the inputted letters from the previously inputted letter to notify (display) by way of the display unit 12 serving as the notification unit. The user of the cellular telephone 1 can thereby clearly recognize the letters pushed at the same time and previously inputted letter.

In addition, when an operation is detected by the operation detecting unit 23 associated with the letter "A" of the first keys 221 after the predetermined time interval T elapsed, and the letter "A" assigned to the operation detecting unit 23 that detects the operation is newly inputted, the controlling unit 35 distinguishes the letter "F" and letter "G" assigned to each of the plurality of different operation detecting units 23 from the newly inputted letter "A" to notify by the display unit 12 serving as the notification unit. The user of the cellular telephone 1 can thereby clearly recognize the letters pushed at the same time in a case of a new letter being inputted following the letters pushed at the same time. Consequently, when keys are pushed at the same time unintentionally, the user of the cellular telephone 1 can prevent in advance a problem in that a new letter is inputted following an unnecessary letter inputted by pushing keys at the same time.

In addition, when operations are detected by the plurality of different operation detecting units 23 associated with the letter "F" and letter "G" of the first keys 221 within the predetermined time interval T, the controlling unit 35 receives as input the letter "F" and the letter "G" assigned to each of the plurality of different operation detecting units 23 that detect the operations, and performs selection of the inputted letters according to a predetermined condition such as pushing of the side key 224, as predetermined processing. The user of the cellular telephone 1 can thereby easily select whether or not to perform predetermined processing, according to a predetermined condition such as pushing of the side key 224.

In addition, in a case of an operations being detected by adjacent operation detecting unit 23, the controlling unit 35 performs predetermined processing. Adjacent operation detecting units 23 are likely to be pushed at the same time, and therefore when operations are detected by adjacent operation detecting units 23, the controlling unit 35 performs predetermined processing. The cellular telephone 1 can thereby achieve a further improvement in operability.

Second Embodiment

Figure 10:
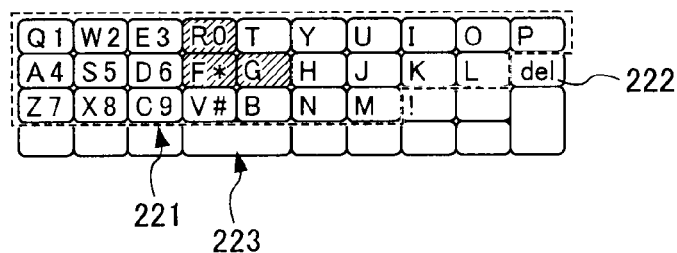
FIG. 10 is a schematic view illustrating a state in which operations are detected by three operation detecting units 23.
Figure 11A:
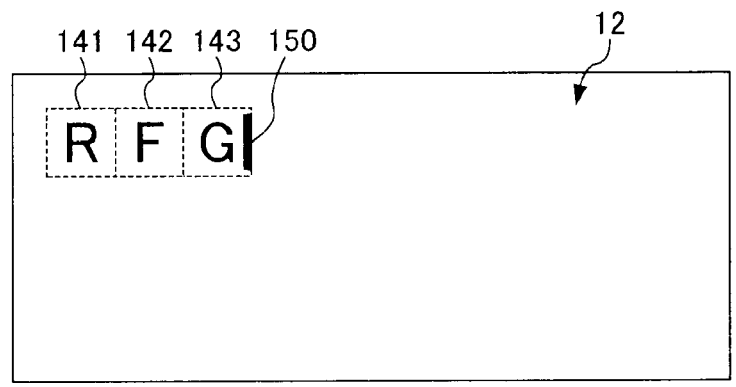
FIG. 11A is a view illustrating processing when operations are detected by three operation detecting units 23.
Figure 11B:
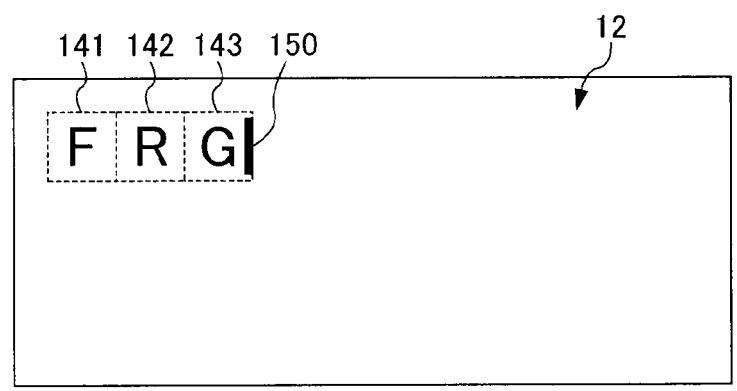
FIG. 11B is a view illustrating processing when operations are detected by three operation detecting units 23.

Next, characteristic operations (processing) of the cellular telephone 1 according to a second embodiment will be described. The second embodiment will be mainly described based on differences from the first embodiment, and the configurations shared with the first embodiment will be assigned the same reference numerals and descriptions thereof will be omitted. The description of the first embodiment is appropriately applied to aspects of the second embodiment that are not specifically described. FIG. 10 is a schematic view illustrating a state in which operations are detected by the three operation detecting units 23 associated with the letter "R", the letter "F" and the letter "G" of the first keys 221 (shaded part in FIG. 3). FIG. 11A and FIG. 11B are views illustrating processing when operations are detected by three operation detecting units 23. The cellular telephone 1 of the second embodiment has functions that allow operability to be improved in a case of operation detecting units 23 being pushed at the same time. Hereinafter, operations (processing) causing the functions to be exhibited by the cellular telephone 1 of the second embodiment will be described.

It should be noted that, in the second embodiment, "the operation detecting units 23 are pushed at the same time" indicates that operations are detected by a plurality of operation detecting units 23 within the predetermined time interval T. In addition, "the operation detecting units 23 are not pushed at the same time" indicates that operations are detected by a plurality of operation detecting units 23 outside the predetermined time interval T. Furthermore, the predetermined time interval T is counted from the time when an operation is first detected by one of the operation detecting units 23 and is measured by timer 352. However, in a case of operations of a plurality of operation detecting units 23 are not detected within the predetermined time interval T, the controlling unit 35 resets the count of the predetermined time interval T after the predetermined time interval T elapses.

That is, "operation detecting units 23 pushed at the same time" includes the one operation detecting unit 23 which detects the operation first, and includes a plurality of operation detecting units 23 which detects an operation from when the operation is detected by the one operation detecting unit 23 until the predetermined time interval T elapses. It should be noted that the predetermined time interval T is, for example, about 0.1 seconds.

When an operation is detected by the operation detecting unit 23, the controlling unit 35 receives as input a letter assigned to the operation detecting unit 23 which detects the operation. It should be noted that the controlling unit 35 makes various settings related to inputted letters such as the color, size, the type of the font, and background color of inputted letters, and inputs (displays) letters to the display unit 12. Then, the controlling unit 35 varies an input rule of letters assigned to each of a plurality of different operation detecting units 23 that detect operations, between a case of operations being detected by a plurality of different operation detecting units 23 outside the predetermined time interval T and a case of operations being detected by a plurality of different operation detecting units 23 within the predetermined time interval T.

More specifically, when operations are detected by a plurality of different operation detecting units 23 outside the predetermined time interval T, the controlling unit 35 receives as input the letters assigned to each of the plurality of different operation detecting units 23 that detect the operations, based on the order in which the operations are detected. On the other hand, when operations are detected by a plurality of different operation detecting units 23 within the predetermined time interval T, the controlling unit 35 receives as input the letters assigned to each of the plurality of different operation detecting units 23 that detect the operations, based on the arrangement positions of the operation detecting units 23 that detect the operations.

More specifically, when operations are detected by the plurality of different operation detecting units 23 associated with the letter "R", the letter "F" and the letter "G" of the first keys 221 outside the predetermined time interval T (see FIG. 10), the controlling unit 35 receives as input the letter "R", the letter "F" and the letter "G" assigned to each of the plurality of different operation detecting units 23 that detect the operations, based on the order in which the operations are detected (see FIG. 11A).

That is, as illustrated in FIG. 11A, when operations are detected in order from the letter "R", the letter "F" and the letter "G" by the plurality of different operation detecting units 23 associated with the letter "R", the letter "F" and the letter "G" of the first keys 221 outside the predetermined time interval T (see FIG. 10), the controlling unit 35 receives as input based on the input rule the letter "R", the letter "F" and the letter "G" assigned to each of the plurality of different operation detecting units 23 that detect the operations, according to the order in which the operations are detected (see FIG. 11A).

On the other hand, when operations are detected by the plurality of different operation detecting units 23 associated with the letter "R", the letter "F" and the letter "G" of the first keys 221 within the predetermined time interval T (see FIG. 10), the controlling unit 35 receives as input the letter "R", the letter "F" and the letter "G" assigned to each of the plurality of operation detecting units 23 that detect the operations, based on the arrangement positions of the operation detecting units 23 that detect the operations (see FIG. 11B).

Here, for the arrangement positions of the letter "R", the letter "F" and the letter "G" associated with the operation detecting units 23 of the first keys 221, among the letter "R", the letter "F" and the letter "G", the letter "R" and the letter "G" are arranged adjacent to the letter "F", which is arranged in the middle thereof. Therefore, when operations are detected by a plurality of different operation detecting units 23 associated with letters of the first keys 221 within the predetermined time interval T, the controlling unit 35 adopts the input rule of first receiving as input the letter for which the operation detecting unit 23 is arranged in the middle, and receiving as input letters according to the order in which the second and subsequent letters are inputted.

That is, as illustrated in FIG. 11B, when operations are detected in order from the letter "R", the letter "F" and the letter "G" by the plurality of different operation detecting units 23 associated with the letter "R", the letter "F" and the letter "G" of the first keys 221 within the predetermined time interval T (see FIG. 10), the controlling unit 35 first receives as input the letter "F" arranged in the middle among the first keys 221 and receives as input the letter "R" and the letter "G" in order, which is the order in which the second and subsequent letters are inputted (see FIG. 11B).

In addition, when operations are detected by a plurality of different operation detecting units 23 outside the predetermined time interval T, the controlling unit 35 receives as input the letters assigned to each of the plurality of different operation detecting units 23 that detect the operations, based on the order in which the operations are detected. On the other hand, when operations are detected by a plurality of different operation detecting units 23 within the predetermined time interval T, the controlling unit 35 receives as input the letters assigned to each of the plurality of different operation detecting units 23 that detect the operations, based on the letter that had been inputted before the operations were detected.

Figure 12:
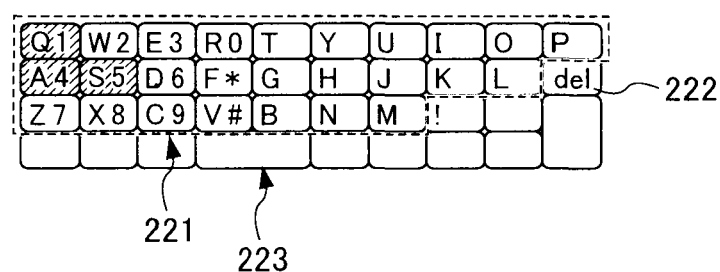
FIG. 12 is a schematic view illustrating a state in which operations are detected by three operation detecting units 23.
Figure 13A:
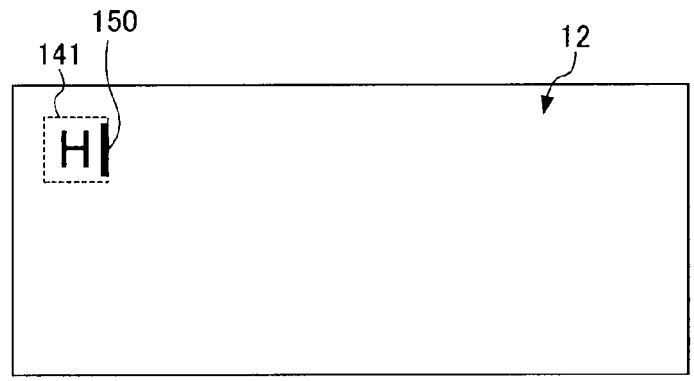
FIG. 13A is a view illustrating other processing when operations are detected by three operation detecting units 23.
Figure 13B:
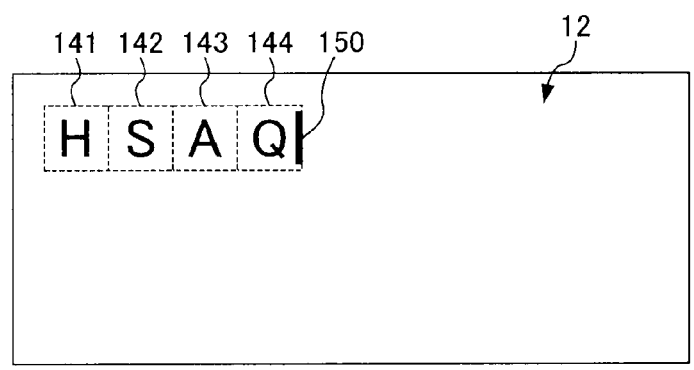
FIG. 13B is a view illustrating other processing when operations are detected by three operation detecting units 23.

More specifically, in a case of the previously inputted letter being a consonant, if operations are detected by a plurality of different operation detecting units 23 within the predetermined time interval T, the controlling unit 35 adopts the input rule of first receiving as input the letter of a vowel (a, i, u, e or o) of the letters associated with the plurality of operation detecting units 23, and then receiving as input the letters according to the order in which the second and subsequent input letters are inputted. That is, in a case of the letter "H" having already been inputted (see FIG. 13), if operations are detected by the plurality of different operation detecting units 23 associated with the letter "S", the letter "A" and the letter "Q" of the first keys 221 outside the predetermined time interval T (see FIG. 12), the controlling unit 35 receives as input based on the input rule the letter "S", the letter "A" and the letter "Q" assigned to each of the plurality of different operation detecting units 23 that detect the operations, according to the order in which the operations are detected (see FIG. 13B).

Figure 13C:
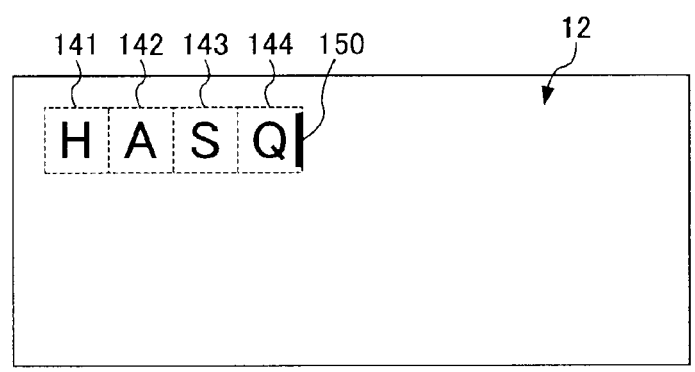
FIG. 13C is a view illustrating other processing when operations are detected by three operation detecting units 23.

On the other hand, in a case of the letter "H" having already been inputted (see FIG. 13A), if operations are detected by the plurality of different operation detecting units 23 associated with the letter "S", the letter "A" and the letter "Q" of the first keys 221 within the predetermined time interval T (see FIG. 12), the letter "H" that had already been inputted is a consonant, and therefore the controlling unit 35 first receives as input the letter "A" which is a vowel and receives as input the letter "R" and the letter "G" in order according to the order in which the second and subsequent input letters are inputted (see FIG. 13C).

In addition, in a case of a symbol (for example, symbol "#") having already been inputted, when operations are detected by a plurality of operation detecting units 23 associated with letters and symbols (for example, the letter "M", the letter "J" and the symbol "!") within the predetermined time interval T, the controlling unit 35 may first receive as input based on another input rule, the symbol "!" and receive as input the letter "M" and the letter "G" in order according to the order in which the second and subsequent letters are inputted.

Similarly, in a case of a number (for example, number "9") having already been inputted, when operations are detected by a plurality of operation detecting units 23 associated with letters and numbers (for example, the letter "T", the letter "G" and the number "0") within the predetermined time interval T, the controlling unit 35 may first receive based on still another input rule the number "0" and receive as input the letter "T" and the letter "G" in order according to the order in which the second and subsequent letters are inputted.

Furthermore, the storage unit 34 (see FIG. 2) may have a database storing predictive transform candidates or letters inputted in the past and are more frequently inputted. Then, in a case of the letter "Z" having already been inputted, if operations are detected by a plurality of operation detecting units 23 associated with letters (for example, the letter "Q", the letter "A" and the letter "S") within the predetermined time interval T, the controlling unit 35 may first receive as input based on still another input rule the letter "A" as a predictive transform candidate of the letter "Z", by referring to the predictive transform function stored in the storage unit 34, and receive as input the letter "Q" and the letter "S" in order according to the order in which the second and subsequent input letters are inputted.

Similarly, in a case of the letter "Z" having already been inputted, if operations are detected by a plurality of operation detecting units 23 associated with letters (for example, the letter "Q", the letter "A" and the letter "S") within the predetermined time interval T, the controlling unit 35 may first receive as input based on still another input rule the letter "S" as more frequently inputted subsequent to the letter "Z", by referring to the frequently inputted letters stored in the storage unit 34, and receive as input the letter "Q" and the letter "A" in order according to the order in which the second and subsequent input letters are inputted.

Figure 14A:
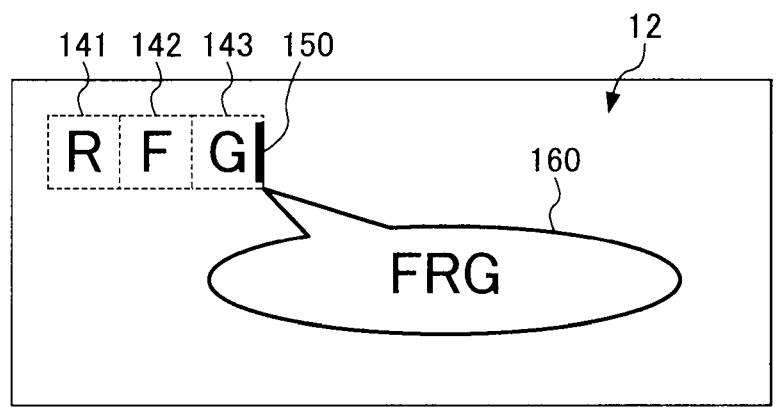
FIG. 14A is a view illustrating other processing when operations are detected by three operation detecting units 23.
Figure 14B:
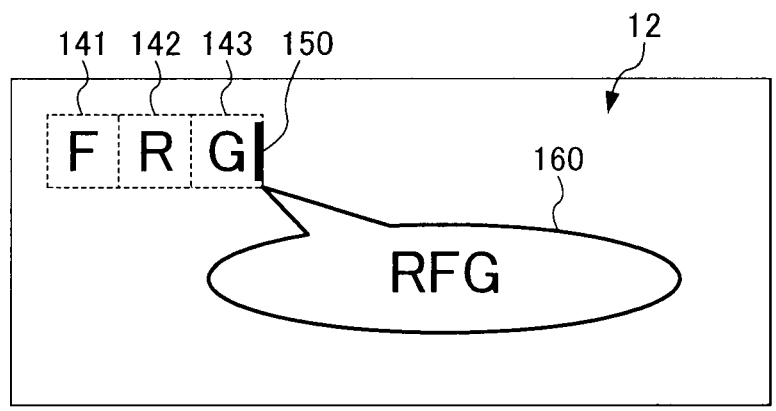
FIG. 14B is a view illustrating other processing when operations are detected by three operation detecting units 23.

FIG. 14A to FIG. 14C are views illustrating other processing when operations are detected by three operation detecting units 23. In a case of operations being detected by a plurality of different operation detecting units 23 outside the predetermined time interval T, the controlling unit 35 may receive as input the letter that should be received as input if a subsequent operation the same as the operations is performed within the predetermined time interval T, according to a predetermined condition. Alternatively, in a case of operations being detected by a plurality of different operation detecting units 23 within the predetermined time interval T, the controlling unit 35 may receive as input the letter which should be received as input if a subsequent operation the same as the operations is performed outside the predetermined time interval T, according to a predetermined condition.

More specifically, in a case of operations being detected by the plurality of different operation detecting units 23 associated with the letter "R", the letter "F" and the letter "G" of the first keys 221 outside the predetermined time interval T (see FIG. 10), the controlling unit 35 receives as input the letter "R", the letter "F" and the letter "G" assigned to each of the plurality of different operation detecting units 23 that detect the operations, based on the order in which the operations are detected, and first inputs (displays) in a pop-up 60 the letter "F" arranged in the middle of the first keys 221 and inputs (displays) in the pop-up 60 the letter "R" and the letter "G" in order according to the order in which the second and subsequent letters are inputted (see FIG. 14A). Then, in a case of an operation being detected by the operation detecting unit 23 associated with the side key 224 as a predetermined condition, the controlling unit 35 receives as input the letters in order from the letter "F", the letter "R" and the letter "G", which is the order in which the letters are inputted to the pop-up 60, in response to detection of the operation by the operation detecting unit 23 associated with the side key 224 (see FIG. 11B).

Alternatively, in a case of operations being detected by the plurality of different operation detecting units 23 associated with the letter "R", the letter "F" and the letter "G" of the first keys 221 outside the predetermined time interval T (see FIG. 10), the controlling unit 35 first receives as input the letter "F" arranged in the middle of the first keys 221 and receives as input the letter "R" and the letter "G" in order, which is the order in which the second and subsequent letters are inputted, and inputs (displays) to the pop-up 60 the letter "R", the letter "F" and the letter "G" assigned to each of the plurality of different operation detecting units 23 that detect the operations, based on the order in which the operations are detected (see FIG. 14B).

Then, in a case of an operation being detected by the operation detecting unit 23 associated with the side key 224 as a predetermined condition, the controlling unit 35 receives as input the letter "R", the letter "F" and the letter "G" in order, which is the order in which the letters are inputted to the pop-up 60, in response to detection of the operation of the operation detecting unit 23 associated with the side key 224 (see FIG. 11A).

It should be noted that, in the second embodiment, "selecting a letter" includes not only a case of the letter and the area associated with this letter being selected and entering an active state, but also a case of the cursor 50 being displayed in the area associated with this letter.

In addition, when pushing of the letter "R" key, the letter "F" key and the letter "G" key, which are adjacent in the first keys 221, is detected by the operation detecting units 23 associated with the respective keys within the predetermined time interval T (see FIG. 10), the controlling unit 35 receives as input the letter "R", the letter "F" and the letter "G" (see FIG. 15A) and performs predetermined processing on the area 41 and area 42 associated with the inputted letter "R", letter "F" and letter "G".

Figure 15A:
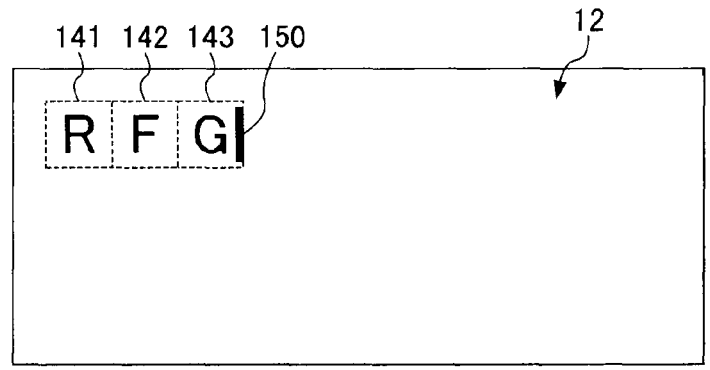
FIG. 15A is a view illustrating other processing when operations are detected by three operation detecting units 23.
Figure 15B:
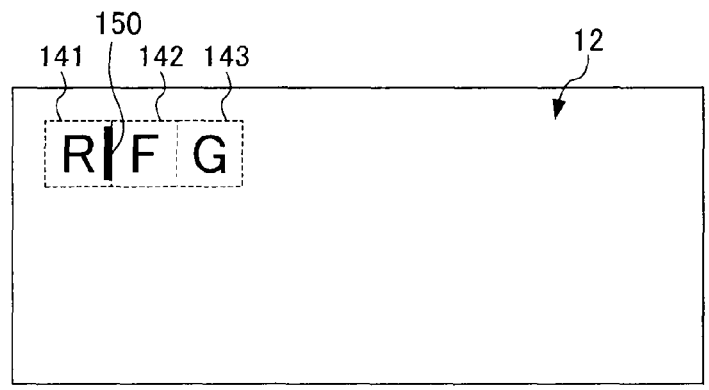
FIG. 15B is a view illustrating other processing when operations are detected by three operation detecting units 23.
Figure 15C:
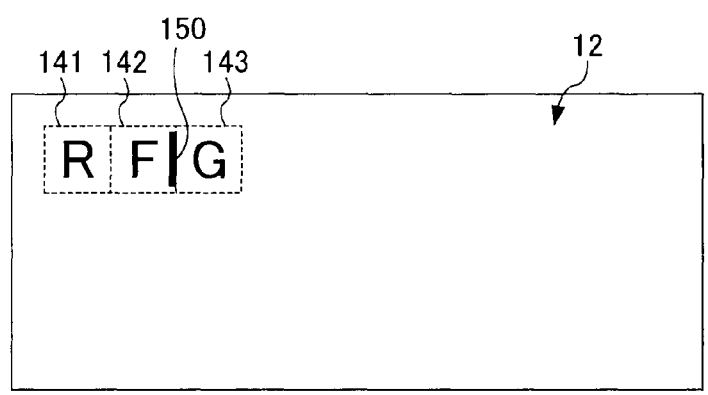
FIG. 15C is a view illustrating other processing when operations are detected by three operation detecting units 23.

Here, the controlling unit 35 performs processing of sequentially selecting one of the inputted letter "R", letter "F" and letter "G" according to the cursor 50 as predetermined processing (see FIG. 15A, FIG. 15B and FIG. 15C). On the other hand, when pushing of the letter "R" key, the letter "F" key and the letter "G" key, which are adjacent among the first keys 221, is detected by the operation detecting units 23 associated with the respective keys outside the predetermined time interval T (see FIG. 10), the controlling unit 35 receives as input the letter "R", the letter "F" and the letter "G" (see FIG. 15A), and does not perform predetermined processing on the area 41 and area 42 associated with the inputted letter "F" and the letter "G".

In addition, the controlling unit 35 may change the order to select one among the inputted letter "R", letter "F" and letter "G" according to a predetermined input rule. For example, "the letter inputted first is selected first" may be used as the input rule. Generally, the controlling unit 35 selects the area 42 associated with subsequently inputted letter "G" using the cursor 50. However, in this case, the controlling unit 35 selects the area 141 associated with the previously inputted letter "R" using the cursor 50. Next, the controlling unit 35 selects the area 142 associated with the subsequently inputted letter "F" using the cursor 50. Then, the controlling unit 35 selects the area 143 associated with the subsequently inputted letter "G" using the cursor 50.

In addition, the controlling unit 35 may change the speed to select one among the inputted letter "R", letter "F" letter "G" based on a predetermined input rule. For example, "the speed to select the letter inputted first is slower than the speed to select the letter inputted subsequently" may be used as the input rule. In this case, the controlling unit 35 selects the area 141 associated with the letter "R" inputted first, during the time interval T1 using the cursor 50. Next, the controlling unit 35 selects the area 142 associated with the subsequently inputted letter "F" and the area 143 associated with the letter "G" during the time interval T2 (T1>T2), which is shorter than the time interval T1, using the cursor 50.

The controlling unit 35 notifies by way of the notification unit by distinguishing the letter "R", the letter "F" or the letter "G" selected as a result of predetermined processing, from the letter "R", the letter "F" or the letter "G" which is not selected as a result of predetermined processing.

That is, by making the display unit 12 display the cursor 50 in the area 141 associated with the letter "R", the area 142 associated with the letter "F" or the area 143 associated with the letter "G", the controlling unit 35 notifies by way of the display unit 12 by distinguishing the selected letter "R", letter "F" or letter "G" from the letter "R", the letter "F" or the letter "G". It should be noted that the notification unit is by no means limited to the display unit 12 and, for example, the controlling unit 35 may notify by varying the tone of the sound outputted from the speaker 15 to distinguish the selected letter "R", letter "F" or letter "G" from the letter "R", the letter "F" or letter "G" not selected.

In addition, in a case of an operation being detected by a specific key among the plurality of different operation detecting units 23 (for example, the first keys 221 assigned a letter, symbol or number) within the predetermined time interval T, the controlling unit 35 performs predetermined processing.

Then, when the controlling unit 35 performs processing of sequentially selecting one among the inputted letter "R", letter "F" and letter "G" using the cursor 50 as predetermined processing, if an operation is detected by the operation detecting unit 23 (specific operation detecting unit) of the operation detecting unit 23 associated with the delete key 222, the controlling unit 35 deletes the letter in the area selected by the cursor 50 as a result of predetermined processing at the point in time when the operation is detected by the operation detecting unit 23 associated with the delete key 222. It should be noted that the present invention is by no means limited to deleting a letter in an area selected using the cursor 50, and may be configured to delete other letters pushed at the same time.

Figure 15D:
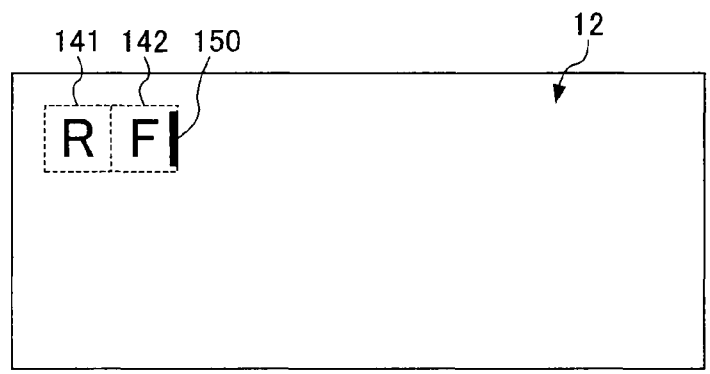
FIG. 15D is a view illustrating other processing when operations are detected by three operation detecting units 23.
Figure 15E:
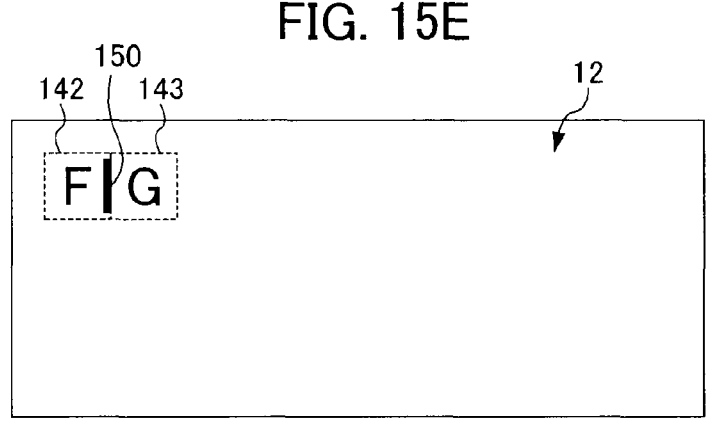
FIG. 15E is a view illustrating other processing when operations are detected by three operation detecting units 23.
Figure 15F:
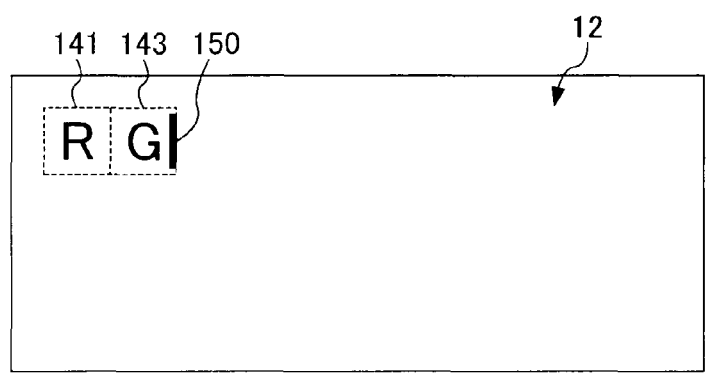
FIG. 15F is a view illustrating other processing when operations are detected by three operation detecting units 23.

More specifically, when the inputted letter "G" is selected using the cursor 50 (see FIG. 15A), if an operation is detected by the operation detecting unit 23 associated with the delete key 222, the controlling unit 35 deletes the letter "G" in the area selected at this point in time (see FIG. 15D). In addition, when the inputted letter "R" is selected using the cursor 50 (see FIG. 15B), if an operation is detected by the operation detecting unit 23 associated with the delete key 222, the controlling unit 35 deletes the letter "R" in the area 141 selected at this point in time (see FIG. 15E). Moreover, when the inputted letter "F" is selected using the cursor 50 (see FIG. 15C), if an operation is detected by the operation detecting unit 23 associated with the delete key 222, the controlling unit 35 deletes the letter "F" in the area 142 selected at this point in time (see FIG. 15F).

Furthermore, the controlling unit 35 may perform notification corresponding to the predetermined processing with the speaker 15 or the vibrator 38 serving as the notification unit. More specifically, the controlling unit 35 performs notification corresponding to the predetermined processing by causing a sound to be output from the speaker 15 or causing the vibrator 38 to vibrate.

FIG. 16A to FIG. 16F are views illustrating a different mode of predetermined processing by the controlling unit 35. When operations are detected by the plurality of different operation detecting units 23 associated with the letter "R", the letter "F" and the letter "G" of the first keys 221 within the predetermined time interval T, the controlling unit 35 receives as input the letter "R", the letter "F" and the letter "G" assigned to each of the plurality of different operation detecting units 23 that detect the operations. Furthermore, when there is a previously inputted letter "A" (hiragana corresponding to "A" key) at the point in time when the operations are detected, the controlling unit 35 may perform predetermined processing by notifying by way of the display unit 12 serving as the notification unit by distinguishing the inputted letters from the previously inputted (see FIG. 16A to FIG. 16F).

Figure 16A:
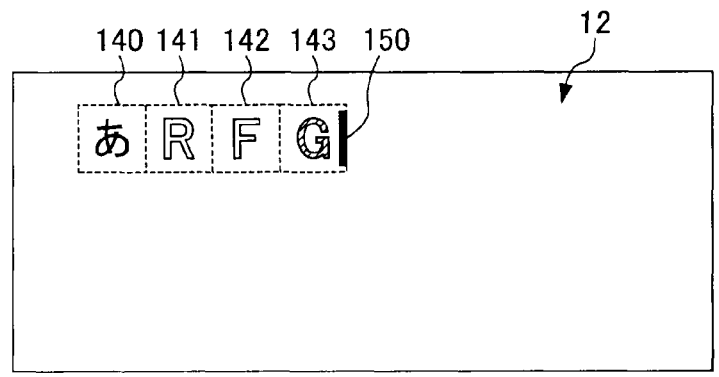
FIG. 16A is a view illustrating a different mode of predetermined processing by the controlling unit 35.
Figure 16B:
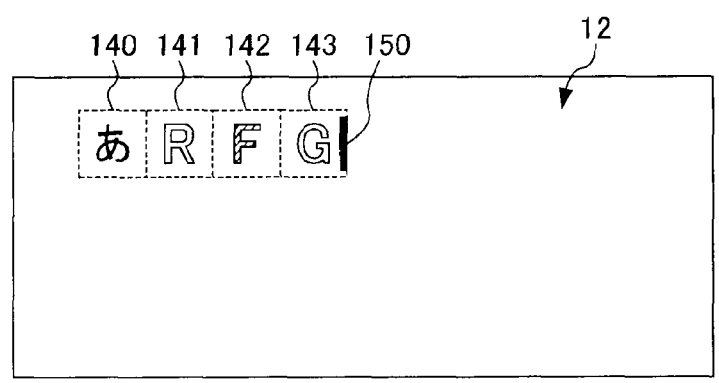
FIG. 16B is a view illustrating a different mode of predetermined processing by the controlling unit 35.
Figure 16C:
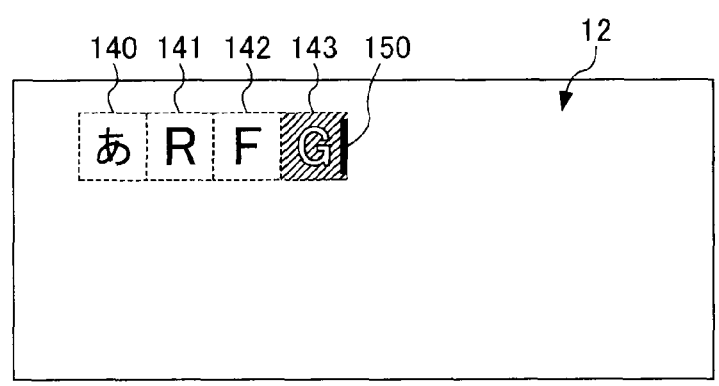
FIG. 16C is a view illustrating a different mode of predetermined processing by the controlling unit 35.
Figure 16D:
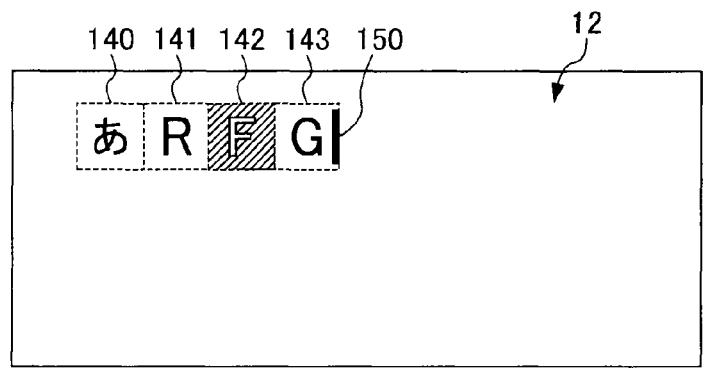
FIG. 16D is a view illustrating a different mode of predetermined processing by the controlling unit 35.
Figure 16E:
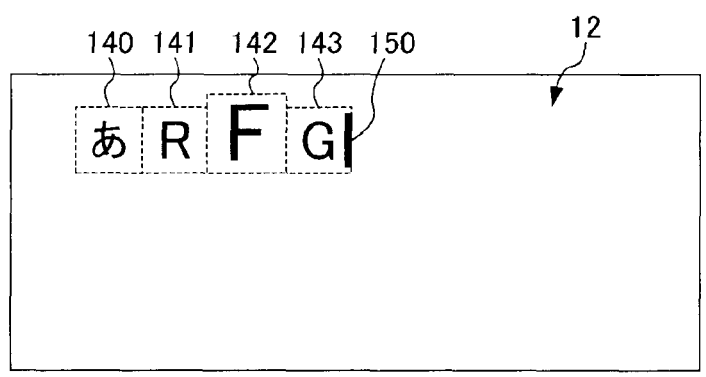
FIG. 16E is a view illustrating a different mode of predetermined processing by the controlling unit 35.
Figure 16F:
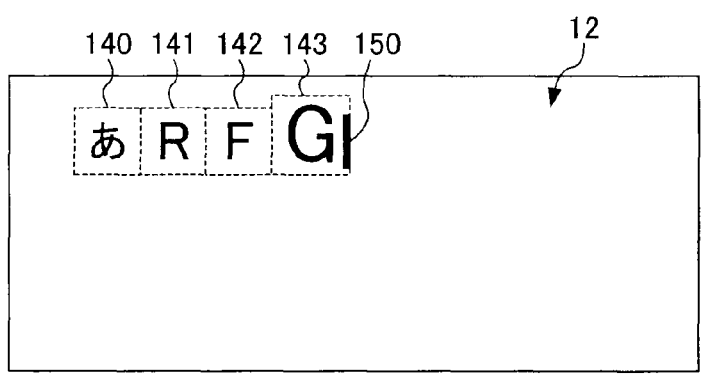
FIG. 16F is a view illustrating a different mode of predetermined processing by the controlling unit 35.
Figure 16G:
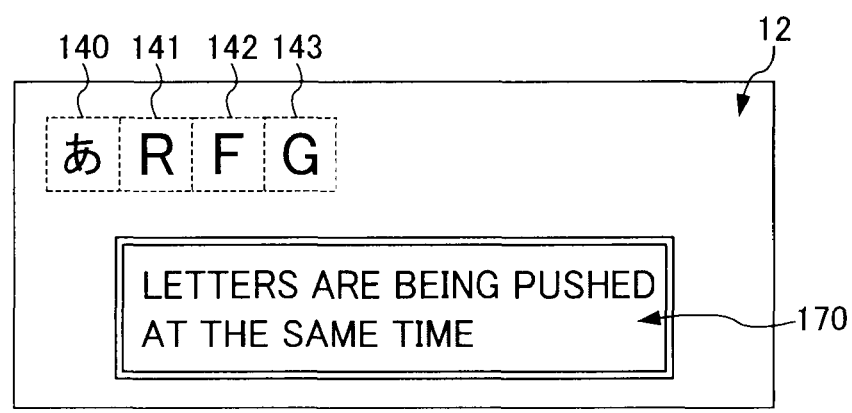
FIG. 16G is a view illustrating a different mode of predetermined processing by the controlling unit 35.

Here, the display unit 12 performs notification (displaying) by, for example, sequentially changing the color of one among the letter "R", the letter "F" and the letter "G" (see FIG. 16A and FIG. 16B), sequentially inverting and displaying one among the area 41, the area 42 and the area 43 associated with the letter "R", the letter "F" and the letter "G" (see FIG. 16C and FIG. 16D), sequentially expanding and displaying one among the letter "R", the letter "F" and the letter "G" (see FIG. 16E and FIG. 16F) or displaying a message showing that the keys are pushed at the same time (see message 170 in FIG. 16G).

In addition, when operations are detected by the plurality of different operation detecting units 23 associated with the letter "R", the letter "F" and the letter "G" of the first keys 221 within the predetermined time interval T, the controlling unit 35 receives as input the letter "R", the letter "F" and the letter "G" assigned to each of the plurality of different operation detecting units 23 that detect the operations. Furthermore, when an operation is detected by the operation detecting unit 23 associated with the letter "A" of the first keys 221 after measuring of the predetermined time interval T has ended, and the letter "A" assigned to the operation detecting unit 23 that detects the operation is newly inputted, the controlling unit 35 may notify by way the display unit 12 serving as the notification unit by distinguishing the letter "R", the letter "F"

and the letter "G" assigned to each of the plurality of different operation detecting units 23, from the additionally inputted letter "A".

Here, the display unit 12 performs notification (displaying) by, for example, sequentially changing the color of one among the letter "R", the letter "F" and the letter "G", sequentially inverting and displaying one among the area 41 and the area 42 associated with the letter "R", the letter "F" and the letter "G", sequentially expanding and displaying one among the letter "R", the letter "F" and the letter "G" or displaying a message showing that the keys are pushed at the same time.

Figure 17:
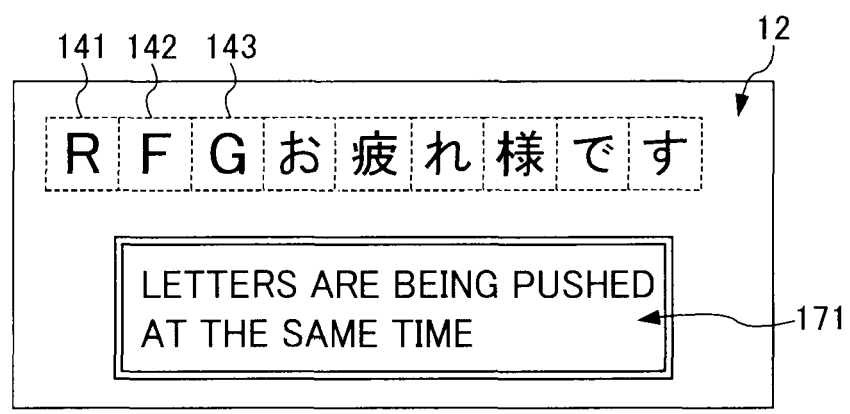
FIG. 17 is a view illustrating a message displayed on the display unit 12 serving as the notification unit.

FIG. 17 is a view illustrating the message displayed on the display unit 12 serving as the notification unit. When operations are detected by the plurality of different operation detecting units 23 associated with the letter "R", the letter "F" and the letter "G" of the first keys 221 within the predetermined time interval T, the controlling unit 35 receives as input the letter "R", the letter "F" and the letter "G" assigned to each of the plurality of different operation detecting units 23 that detect the operations. Furthermore, when an operation of ending the function associated with the inputted letter (for example, the function of inputting an electronic mail text of an electronic mail application) after the predetermined time interval T has elapsed, the controlling unit 35 may display on the display unit 12 the message 71 for notifying the operation (see FIG. 17).

Figure 18:
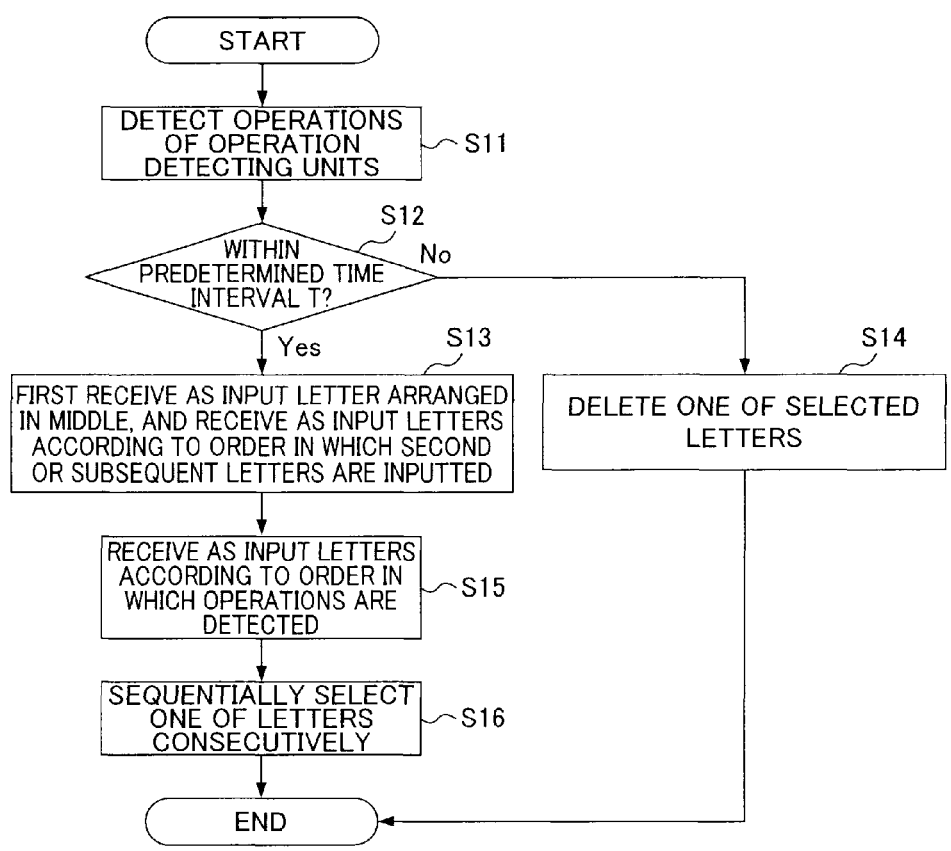
FIG. 18 is a flowchart illustrating an example of processing by the controlling unit 35.

FIG. 18 is a flowchart illustrating an example of the above processing by the controlling unit 35. It should be noted that, in the processing illustrated in FIG. 11, a case is described in which the operation detecting units 23 associated with the letter "R", the letter "F" and the letter "G" of the first keys 221 are operated.

In Step S11, the operation detecting units 23 detect the operations of the first keys 221 associated with the letter "R", the letter "F" and the letter "G" (see FIG. 10).

In Step S12, the controlling unit 35 determines whether or not the operations detected is within the predetermined time interval T. In a case of the operations being detected within the predetermined time interval T, the pressing advances to Step S13. On the other hand, in a case of the operations being detected outside the predetermined time interval T, the processing advances to Step S14.

In Step S13, the controlling unit 35 first receives as input the letter "F" arranged in the middle of the first keys 221, and receives as input the letter "R" and the letter "G" in order, which is the order in which the second and subsequent letters are inputted (see FIG. 11B).

In Step S14, the controlling unit 35 receives as input the letter "R", the letter "F" and the letter "G" assigned to each of the plurality of different operation detecting units 23 that detect the operations, in order from the letter "R", the letter "F" and the letter G" according to the order in which the operations are detected, as the input rule (see FIG. 11A).

In Step S15, the controlling unit 35 performs processing of sequentially selecting one among the inputted letter "R", letter "F" and letter "G" using the cursor 50, as predetermined processing (see FIG. 11A and FIG. 11B).

In Step S16, if an operation is detected by the operation detecting unit 23 associated with the delete key 222 when the inputted letter "G" is being selected using the cursor 50 (see FIG. 15A), the controlling unit 35 deletes the letter "G" in the area 42 selected at this point in time (see FIG. 15D). In addition, if an operation is detected by the operation detecting unit 23 associated with the delete key 222 when the inputted letter "F" is being selected by the cursor 50, the controlling unit 35 deletes the letter "F" in the area 41 selected at this point in time (see FIG. 15E). Furthermore, if an operation is detected by the operation detecting unit 23 associated with the delete key 222 when the inputted letter "R" is being selected by the cursor 50, the controlling unit 35 deletes the letter "R" in the area 41 selected at this point in time (see FIG. 15F).

The cellular telephone 1 according to the second embodiment can provide the following effects. The controlling unit 35 varies the input rule of the letters assigned to each of the plurality of different operation detecting units 23 that detect the operations, between a case of operations being detected by a plurality of different operation detecting units 23 outside the predetermined time interval T and a case of operations being detected by a plurality of different operation detecting units 23 within the predetermined time interval T.

That is, the controlling unit 35 varies the input rule of inputted letters, between a case of a plurality of operation detecting units 23 being pushed at the same time and a case of a plurality of operation detecting units 23 not being pushed at the same time. As a result, the cellular telephone 1 can achieve a further improvement in operability.

In addition, when operations are detected by a plurality of different operation detecting units 23 outside the predetermined time interval T, the controlling unit 35 receives as input the letters assigned to each of the plurality of different operation detecting units 23 that detect the operations, based on the order in which the operations are detected. On the other hand, when operations are detected by a plurality of different operation detecting units 23 within the predetermined time interval T, the controlling unit 35 receives as input the letters assigned to each of the plurality of different operation detecting units 23 that detect the operations, based on the arrangement positions of the operation detecting units 23 that detect the operations.

By this means, the cellular telephone 1 thereby receives as input letters based on the arrangement positions of the operation detecting units 23 pushed at the same time in a case of a plurality of operation detecting units 23 being pushed at the same time. As a result, letters pushed at the same time are inputted based on the arrangement positions of the operation detecting units 23 in a case of the user of the cellular telephone 1 mistakenly operating a plurality of operation detecting units 23 despite trying to operate a single operation detecting unit 23. Therefore, for example, letters which are originally inputted unintentionally can be easily deleted. Consequently, the cellular telephone 1 can achieve a further improvement in operability.

In addition, when operations are detected by a plurality of different operation detecting units 23 outside the predetermined time interval T, the controlling unit 35 receives as input the letters assigned to each of the plurality of different operation detecting units 23 that detect the operations, based on the order in which the operations are detected. On the other hand, when operations are detected by a plurality of different operation detecting units 23 within the predetermined time interval T, the controlling unit 35 receives as input the letters assigned to each of the plurality of different operation detecting units 23 that detect the operations, based on the letter which had already been inputted before the operations were detected.

The cellular telephone 1 thereby receives as input a letter based on the previously inputted letter when there is a previously inputted letter before the operation detecting units 23 are pushed at the same time. As a result, the cellular telephone 1 first receives as input, for example, the letter which should be essentially inputted first, and then receives as input the letter which should not be inputted. Consequently, the cellular telephone 1 can achieve a further improvement in operability.

In addition, in a case of operations being detected by a plurality of different operation detecting units 23 outside the predetermined time interval T, the controlling unit 35 may receive as input a letter which should be inputted if a subsequent operation the same as the operations is performed within the predetermined time interval T, according to a predetermined condition. Furthermore, in a case of operations being detected by a plurality of different operation detecting units 23 within the predetermined time interval T, the controlling unit 35 may receive as input a letter which must be inputted if a subsequent operation the same as the operations is performed, according to a predetermined condition.

The cellular telephone 1 can thereby select input rules for a case in which keys are pushed at the same time and a case in which keys are not pushed at the same time, according to a predetermined condition, and, consequently, can achieve a further improvement in operability.

In addition, the controlling unit 35 performs processing of sequentially selecting one among the inputted letter "R", the letter "F" and the letter "G" using the cursor 50, as predetermined processing. In other words, the cellular telephone 1 sequentially selects one among the letter "R", the letter "F" and the letter "G" pushed at the same time, using the cursor 50. Letters pushed at the same time are thereby sequentially selected in a case of the user of the cellular telephone 1 mistakenly operating a plurality of operation detecting units 23 despite trying to operate a single operation detecting unit 23, the. As a result, the user of the cellular telephone 1 can easily delete a letter which was originally inputted unintentionally. Consequently, the cellular telephone 1 can achieve a further improvement in operability.

In addition, the controlling unit 35 changes the order to select one among the inputted letter "R", the letter "F" and the letter "G", according to a predetermined input rule. The user can thereby more quickly delete the letter inputted by an operation mistake in a case of the user of the cellular telephone 1 mistakenly pushing keys at the same time, by performing an operation taking into account a predetermined rule.

In addition, the controlling unit 35 changes the speed to select one among the inputted letter "R", the letter "F" and the letter "G" according to a predetermined input rule. The user of the cellular telephone 1 can thereby more reliably select one of the letters pushed at the same time and, consequently, more quickly delete the letter inputted by an operation mistake.

Furthermore, when the controlling unit 35 is performing processing of sequentially selecting one among the inputted letter "R", the letter "F" and the letter "G" using the cursor 50 as predetermined processing, if an operation is detected by the operation detecting unit 23 of the operation detecting units 23 associated with the delete key 222, the controlling unit 35 deletes the letter in the area selected by the cursor 50 as a result of predetermined processing at the point in the time when the operation is detected by the operation detecting unit 23 associated with the delete key 222. The user of the cellular telephone 1 can thereby more reliably delete one of the letters pushed at the same time. Consequently, the cellular telephone 1 can achieve a further improvement in operability.

In addition, the controlling unit 35 notifies by way of the display unit 12 by distinguishing the letter "R", the letter "F" or the letter "G" selected as a result of predetermined processing, from the letter "R", the letter "F" or the letter "G" not selected as a result of predetermined processing. The user of the cellular telephone 1 can thereby clearly recognize the letters pushed at the same time.

In addition, in a case of an operation being detected by a specific operation detecting unit 23 (for example, the first key 221) among the plurality of different operation detecting units 23 within the predetermined time interval T, the controlling unit 35 performs predetermined processing. According to this configuration, in a case of the second key 223 such as the Shift key or Ctrl key, which is frequently pushed at the same time, being operated, predetermined processing is not performed, and in a case of the first key 221 being operated, predetermined processing is performed, whereby the cellular telephone 1 can achieve an improvement in operability according to the operation of the operation detecting units 23.

In addition, the controlling unit 35 performs notification corresponding to the predetermined processing with the speaker 15 or the vibrator 38 serving as the notification unit. It is thereby possible to notify of the fact that keys are pushed at the same time, even in a case of the user of the cellular telephone 1 not visually checking the display unit 12.

Furthermore, when an operation is detected by the operation detecting unit 23 associated with the letter "A" of the first keys 221 after the predetermined time interval T elapses, and the letter "A" assigned to the operation detecting unit 23 the detects the operation is newly inputted, the controlling unit 35 notifies by way of the display unit 12 serving as the notification unit by distinguishing the letter "F" and the letter "G" assigned to each of the plurality of different operation detecting units 23 from the newly inputted letter "A". The user of the cellular telephone 1 can thereby recognize the letters pushed at the same time in a case of a letter being newly inputted subsequent to the letters pushed at the same time.

In addition, a case of operations being detected by adjacent operation detecting units 23, the controlling unit 35 performs predetermined processing. Since adjacent operation detecting units 23 are likely to be pushed at the same time, in a case of operations being detected by adjacent operation detecting units 23, the cellular telephone 1 can achieve a further improvement in operability by performing predetermined processing.

Although embodiments of the present invention have been described above, the present invention is by no means limited to the above embodiments, and suitable modifications thereto are possible. For example, in the above embodiments, the first body 10 and second body 20 of the cellular telephone 1 are configured to be movable along the opening/closing direction D by means of the connecting member. However, the present invention is by no means limited to this and, for example, the cellular telephone 1 may be configured such that the operating unit 22 with a key arrangement of a QWERTY arrangement is provided in a straight-type body. In addition, the key arrangement is by no means limited to a QWERTY arrangement, and may be another key arrangement such as a JIS arrangement.

Furthermore, although the operating unit 22 of the cellular telephone 1 is configured with physical members (operation key members 22a and key substrate 22b) in the above embodiments, the present invention is by no means limited to this. For example, the display unit 12 may be configured with a touch panel, and the operating unit 22 may be a virtual keyboard displayed on this touch panel. The virtual keyboard is displayed on the display unit 12, and therefore the keys have particularly small display sizes and are displayed without gaps between keys. Therefore, since keys are likely to be pushed at the same time, the cellular telephone 1 in which the operating unit 22 is displayed on the touch panel can achieve a further improvement in operability by employing the present invention. In addition, although the del (delete) key is used as the delete key 222 for deleting letters in the above embodiments, letters may be deleted by operating other keys.

Furthermore, although the cellular telephone 1 has been described as a portable electronic device in the above embodiments, the present invention is by no means limited to this and may be, for example, a PHS (Personal Handy phone System (registered trademark)), PDA (Personal Digital Assistant), portable navigation device, personal computer, notebook computer, portable game device, or the like.

What is claimed is:

1. A portable electronic device comprising:
    a display unit;
    a plurality of operating units including a first operating unit and a second operating unit;
    a controlling unit that receives as input, when an operation to an operating unit is detected, a character assigned to the operating unit by which the operation was detected; and
    a time measuring unit that measures a time interval between a first operation to the first operating unit and a second operation to the second operating unit,
    wherein the controlling unit sequentially selects by a cursor between a first character displayed in response to the first operation and a second character displayed in response to the second operation in a case the time interval between the first operation and the second operation is less than a predetermined.

2. The portable electronic device according to claim 1, wherein the controlling unit performs predetermined processing on a plurality of characters inputted in response to the first operation and the second operation in a case of the time interval being less than the predetermined time, and does not perform predetermined processing on a plurality of characters inputted in response to the first operation and the second operation in a case of the time interval being at least the predetermined time.

3. The portable electronic device according to claim 2, further comprising a notification unit,
    wherein, in a case of the time interval being less than the predetermined time and a character being additionally inputted following the operations of the operating units after the predetermined time elapses, the controlling unit notifies by way of the notification unit by distinguishing the plurality of characters inputted in response to the first operation and the second operation from the additionally inputted character, as the predetermined processing.

4. The portable electronic device according to claim 1, wherein the controlling unit changes an order or a speed to select one by one the plurality of characters inputted, based on a predetermined rule.

5. The portable electronic device according to claim 1, wherein, in a case of a specific operating unit among the operating units being operated when the controlling unit is performing the predetermined processing, the controlling unit deletes a character selected at a point in time when the specific operating unit is operated, or deletes a character other than a character selected among the plurality of characters inputted.

6. The portable electronic device according to claim 1, wherein the controlling unit varies an input rule of the plurality of characters inputted in response to the first operation and the second operation, between a case of the time interval being less than the predetermined time and a case of the time interval being at least the predetermined time.

7. The portable electronic device according to claim 6, wherein the controlling unit receives as input the plurality of characters based on an order in which the operating units are operated in a case of the time interval being at least the predetermined time, and receives as input the plurality of characters based on arrangement positions of the operating units operated in a case of the time interval being less than the predetermined time interval.

8. The portable electronic device according to claim 6, wherein the controlling unit receives as input the plurality of characters based on an order in which the operating units are operated in a case of the time interval being at least the predetermined time, and receives as input the plurality of characters based on a character which had already been inputted before the first operation in a case of the time interval being less than the predetermined time.

9. The portable electronic device according to claim 6, wherein,
    when a plurality of the operating units are operated in a time interval of at least the predetermined time, the controlling unit receives as input, according to a predetermined condition, a character inputted in a case of a subsequent operation the same as the operation that is assumed to be performed in a time interval less than the predetermined time, or
    when a plurality of the operating units are operated in a time interval less than the predetermined time, the controlling unit receives as input, according to a predetermined condition, a character inputted in a case of a subsequent operation the same as the operation that is assumed to be performed in a time interval of at least the predetermined time.

10. The portable electronic device according to claim 6, wherein the controlling unit receives as input a plurality of characters corresponding to the first operation and the second operation, and sequentially selects one by one the plurality of characters thus inputted, in a case of the time interval being less than the predetermined time.

11. The portable electronic device according to claim 10, wherein the controlling unit changes an order or a speed to select one by one the plurality of characters inputted in response to the first operation and the second operation, based on the input rule.

12. The portable electronic device according to claim 10, wherein, when the controlling unit is selecting one by one the plurality of characters inputted in response to the first operation and the second operation, if a specific operating unit among the operating units is operated, the controlling unit deletes a character selected at a point in time when the specific operating unit is operated, or deletes a character other than a character selected among the plurality of characters inputted.

13. The portable electronic device according to claim 6, further comprising a notification unit,
    wherein, in a case of the time interval being less than the predetermined time and there being a previously inputted character which had already been inputted at a point in time when the first operation was detected, the controlling unit notifies by way of the notification unit by distinguishing the plurality of characters inputted from the previously inputted character.

14. The portable electronic device according to claim 1, further comprising a display unit that displays characters and a cursor specifying a character to be a target of processing,
    wherein, the controlling unit varies a condition related to an arrangement position of the cursor with respect to the plurality of characters inputted in response to the first operation and the second operation, between a case of the time interval being less than the predetermined time and a case of the time interval being at least the predetermined time.

15. The portable electronic device according to claim 14, wherein the controlling unit sequentially selects one by one by way of the cursor the plurality of characters inputted, in a case of the time interval being less than the predetermined time.

16. The portable electronic device according to claim 14, wherein the controlling unit varies a condition related to the arrangement position of the cursor with respect to the plurality of characters inputted by varying an input rule of the plurality of characters inputted in response to the first operation and the second operation, between a case of the time interval being less than the predetermined time and a case of the time interval being at least the predetermined time.

17. A portable electronic device comprising:
   a display unit;
   a plurality of operating units including a first operating unit and a second operating unit;
   a controlling unit that receives as input, when an operation to an operating unit is detected, a character assigned to the operating unit by which the operation was detected;
   a time measuring unit that measures a time interval between a first operation to the first operating unit and a second operation to the second operating unit; and
   a notification unit,
   wherein, in a case of the time interval being less than the predetermined time and there being a previously inputted character which had already been inputted at a point in time when the first operation is detected, the controlling unit notifies by way of the notification unit by distinguishing the plurality of characters inputted in response to the first operation and the second operation from the previously inputted character, and by further distinguishing one character of the plurality of characters from the other character.

18. A control method of a portable electronic device, comprising:
   receiving as input, when an operation to an operating unit is detected, a character assigned to the operating unit by which the operation was detected,
   measuring a time interval between a first operation to a first operating unit and a second operation to a second operating unit, and
   sequentially selecting by a cursor between a first character displayed in response to the first operation and a second character displayed in response to the second operation in a case the time interval between the first operation and the second operation is less than a predetermined time.

19. A non-transitory computer-readable medium storing instructions that, when executed by a processing device of a portable electronic device, cause the processing device to perform operations comprising:
   receiving as input, when an operation to an operating unit is detected, a character assigned to the operating unit by which the operation was detected;
   measuring a time interval between a first operation to a first operation key member and a second operation to a second operation key member; and
   varying processing on a plurality of characters inputted in response to the first operation and the second operation, between a case of the time interval between the first operation and the second operation being less than a predetermined time and a case of the time interval being at least the predetermined time.

* * * * *